(12) United States Patent
Rovner et al.

(10) Patent No.: US 8,059,658 B1
(45) Date of Patent: Nov. 15, 2011

(54) METHOD AND SYSTEM FOR AUTOMATIC EXPANSION AND CONTRACTION OF IP HOST FORWARDING DATABASE

(75) Inventors: Edward J. Rovner, Chapel Hill, NC (US); Olen L. Stokes, Cary, NC (US); Justus W. Gries, Morrisville, NC (US); Donald B. Grosser, Apex, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 599 days.

(21) Appl. No.: 12/060,111

(22) Filed: Mar. 31, 2008

Related U.S. Application Data

(63) Continuation-in-part of application No. 11/644,701, filed on Dec. 22, 2006, and a continuation-in-part of application No. 11/317,665, filed on Dec. 23, 2005.

(51) Int. Cl.
*H04L 12/28* (2006.01)
*H04L 12/56* (2006.01)

(52) U.S. Cl. ............ 370/395.31; 370/395.3; 370/395.1; 711/221

(58) Field of Classification Search .................. 370/395; 711/170
See application file for complete search history.

(56) References Cited

U.S. PATENT DOCUMENTS

| | | | |
|---|---|---|---|
| 5,049,780 A | 9/1991 | Dobrowolski et al. | |
| 5,986,401 A | 11/1999 | Thompson et al. | |
| 6,011,277 A | 1/2000 | Yamazaki | |
| 6,452,270 B1 | 9/2002 | Huang | |
| 6,470,425 B1 | 10/2002 | Yamashiroya | |
| 6,788,697 B1* | 9/2004 | Aweya et al. | 370/412 |
| 6,858,271 B1 | 2/2005 | Okada et al. | |
| 7,174,441 B2* | 2/2007 | Singh et al. | 711/206 |
| 7,544,884 B2 | 6/2009 | Hollars | |
| 2003/0163660 A1* | 8/2003 | Lam | 711/170 |
| 2006/0187930 A1* | 8/2006 | Smith et al. | 370/392 |

OTHER PUBLICATIONS

Written Opinion and International Search Report for PCT/US05/38137, mailed Feb. 6, 2008, originally cited in U.S. Appl. No. 11/664,701.

J.H. Burroughes, D.D.C. Bradley, A.R. Brown, R.N. Marks, K. Mackey and R.H. Friend, Nature, 347, 539 (1990), originally cited in U.S. Appl. No. 11/664,701.

(Continued)

*Primary Examiner* — Daniel Wu
*Assistant Examiner* — Frederick Ott
(74) *Attorney, Agent, or Firm* — Blakely, Sokoloff, Taylor & Zafman

(57) ABSTRACT

An indication of a host route to be added to a forwarding database table as an entry is received. The host route is added to a first hardware table or a second hardware table if a space is available in the second hardware table or in a first storage area of the first hardware table. The first hardware table has both a first storage area and a second storage area. If a space is not available in the second hardware table or the first storage area of the first hardware table, the first storage area of the first hardware table is automatically expanded to include unused space in the second storage area of the first hardware table. The host route is then added to a space in the expanded first storage area of the first hardware table.

21 Claims, 14 Drawing Sheets

OTHER PUBLICATIONS

C.N. King, Inorganic and Organic Electroluminescence, edited by R.H. Mauch and H.E. Gumlich (Wissenchaft & Technik Berlag, Berlin 1996), p. 375), originally cited in U.S. Appl. No. 11/664,701.

A. Yamamori, S. Hayashi, T. Koyama, and Y. Taniguchi, Appl. Phys. Letts, 78, 3343 (2001), originally cited in U.S. Appl. No. 11/664,701.

G. Gu, V. Bulovic, P.E. Burrows, S.R. Forrest, and M.E. Thompson, Appl. Phys. Lettts, 68, 2606 (1996), originally cited in U.S. Appl. No. 11/664,701.

L.S. Hung and C.W. Tang, Appl. Phys. Letts, 74, 3209 (1999), originally cited in U.S Appl. No. 11/664,701.

G. Pathasarathy, P.E. Burrows, V. Khalfin, V.G. Kozolov, and S.R. Forrest, Appl. Phys. Letts, 72, 2138 (1998), originally cited in U.S Appl. No. 11/664,701.

B. Bulovic, P. Tian, P.E. Burrows, M.R. Gokhale, S.R. Forrest, and M.E. Thompson Appl. Phys. Letts, 70, 1954 (1997), originally cited in U.S. Appl. No. 11/664,701.

H. Kim, C.M. Gilmore, J.S. Horwitz, A. Pique, H. Murata, G.P. Kushto, R. Schlaf, Z.H. Kafafi and D.B. Crisey, Appl. Phys. Letts 76, 259 (2000), originally cited in U.S. Appl. No. 11/664,701.

C.W. Tang and S.A. Vanslyke, Appl. Phys. Letts, 41, 913 (1987), originally cited in U.S. Apl. No. 11/664,701.

L.S. Hung, C.W. Tang, M.G. Mason, P. Raychaudhuri, and J. Madathil, Appl. Phys. Letts, 78, 544 (2000), originally cited in U.S. Appl. No. 11/664,701.

R.B. Pode, C.J. Lee, D.G. Moon, and J.I. Han, Appl. Phys. Letts, 84, 4614 (2004), originally cited in U.S. Appl. No. 11/664,701.

P.W. Gilberd, J. Phys. F: Met, Phys. 12, 1845 (1982), originally cited in U.S. Appl. No. 11/664,701.

Q. Xu, J. Ouyang, Y. Yang, Appl. Phys. Letts, 83, 4695 (2003), originally cited in U.S. Appl. No. 11/664,701.

R.A. Chipman, Theory and Problems of Transmission Lines (Schaum Outline Series 1968), p. 78 & 85, originally cited in U.S. Appl. No. 11/664,701.

M. Stossel, J. Staudigel, F. Steuber, J. Simmerer, and A. Winnacker, Appl. Phys. A: Mater Sci. Process, 68, 387 (1999), originally cited in U.S. Appl. No. 11/664,701.

L.S. Hung, C.W. Tang, and M.G. Mason, Appl. Phys. Letts, 70, 152 (1997), originally cited in U.S. Appl. No. 11/664,701.

L.S. Hung, M.G. Mason, EL000 47 (2000), originally cited in U.S. Appl. No. 11/664,701.

F.L. Wong, M.K. Fung, X. Jiang, C.S. Lee, Thin Solid Films 446, 14 (2004), originally cited in U.S. Appl. No. 11/664,701.

F.L. Wong, M.K. Fung, X. Jiang, C.S. Lee, This Solid Films 446, 14 (2004), originally cited in U.S. Appl. No. 11/664,701.

J. Ivanco, B. Winter, F.P. Netzer, and M.G. Ramsey, Appl. Phys. Letts, 85, 585 (2004), originally cited in U.S. Appl. No. 11/664,701.

S. Han, D. Grozea, C. Huang, and Z.H. Lu, J. Appl. Phys 96, 709 (2004), originally cited in U.S. Appl. No. 11/664,701.

B. Abeles, P. Sheng, M.D. Coutts, and Y. Arie, Adv. Phys. 24, 407 (1975), originally cited in U.S. Appl. No. 11/664,701.

T. Holstein, Phys. Rev. 88, 1427 (1952), originally cited in U.S. Appl. No. 11/664,701.

B. Abeles, RCE Rev. 36, 594 (1975), originally cited in U.S. Appl. No. 11/664,701.

M. Hiramoto, M. Suezaki, and M. Yokoyama, Chem. Lett. 1990, 327 (1990), originally cited in U.S. Appl. No. 11/664,701.

A. Yakimov and S.R. Forrest, Appl. Phys. Lett. 80, 1667 (2002), originally cited in U.S. Appl. No. 11/664,701.

L.P. Ma, J. Liu, and Y. Yang, Appl. Phys. Lett. 80, 2997 (2002), originally cited in U.S. Appl. No. 11/664,701.

R.S. Potember, T.O. Poehler, D.O. Cowman, Appl. Phys. Lett, 34, 405 (1979), originally cited in U.S. Appl. No. 11/664,701.

J. van den Brand, P.C. Snijders, W.G. Sloof, H. Terryn, and J.H.E. de Wit, J. Phys. Chem. B, 108, 6017 (2004), originally cited in U.S. Appl. No. 11/664,701.

L.P. Ma, S.M. Phy, J.Y. Ouyang, Q.F. Xu, and Y. Yang, Appl. Phys. Letts. 82, 1419 (2003), originally cited in U.S. Appl. No. 11/664,701.

L.P. Ma, S.M. Pyo, J.Y. Ouyang, Q.F. Xu, and Y. Yang, Appl. Phys. Lett. 82, 1419 (2003), originally cited in U.S. Appl. No. 11/664,701.

A. Bandyopadhyay and A.J. Pal, Appl. Phys. Lett. 84, 999 (2004), originally cited in U.S. Appl. No. 11/664,701.

W. Xu, G.R. Chen, R.J. Li, and Z.Y. Hua, Appl. Lett 67, 2241 (1995) originally cited in U.S. Appl. No. 11/664,701.

L.P. Ma, U.J. Yang, Z.Q. Xue, and S.J. Pang, Appl. Phys. Lett, 73, 850 (1998), originally cited in U.S. Appl. No. 11/664,701.

H.K. Henish, and W.R. Smith, Appl. Phys. Lett. 24, 589 (1974), originally cited in U.S. Appl. No. 11/664,701.

M.R. Bryce, Adv. Mat. 11, 11 (1999), originally cited in U.S. Appl. No. 11/664,701.

Huan Liu, "Routing Prefix Caching in Network Processor Design," IEEE Proceedings, Computer Communications Networsk, Oct. 15-17, 2001, pp. 18-23, originally cited in U.S. Appl. No. 11/317,665.

Office Action for U.S. Appl. No. 11,664,701, dated Nov. 3, 2009, 12 pages.

Office Action for U.S. Appl. No. 11/317,665, dated Oct. 1, 2008, 13 pages.

Office Action for U.S. Appl. No. 11/317,665, dated May 11, 2009, 13 pages.

* cited by examiner

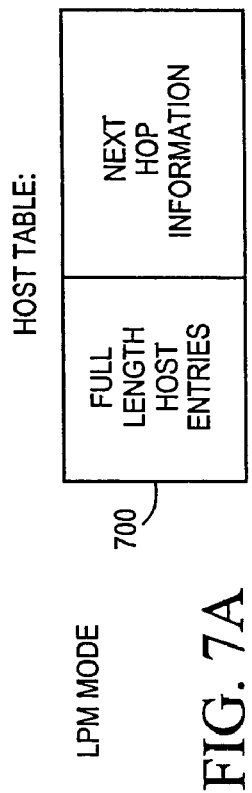
FIG. 7A LPM MODE
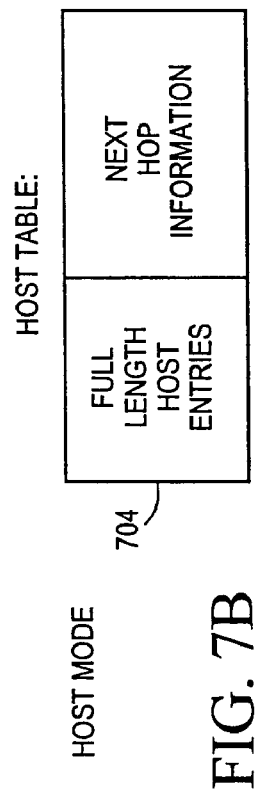
FIG. 7B HOST MODE
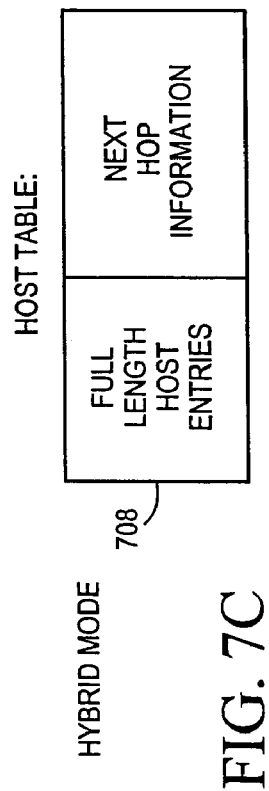
FIG. 7C HYBRID MODE

METHOD AND SYSTEM FOR AUTOMATIC EXPANSION AND CONTRACTION OF IP HOST FORWARDING DATABASE

RELATED APPLICATIONS

This application is a Continuation-in-Part of U.S. patent application Ser. No. 11/644,701 filed on Dec. 22, 2006, entitled Method, Systems, and Computer Program Products and of U.S. patent application Ser. No. 11/317,665 filed on Dec. 23, 2005, entitled Method, Systems, and Computer Program Products and claims priority thereto.

FIELD

The subject matter described herein relates to layer 3 packet routing. More particularly, the subject matter described herein relates to provisioning of a hardware forwarding table for routing layer 3 packets.

BACKGROUND

Packet forwarding devices, such as layer 3 or IP routers, typically use one or more tables to store packet forwarding information. For example, layer 3 packet forwarding devices may include a hardware-implemented layer 3 host table that typically stores entries corresponding to hosts that are directly connected to the packet forwarding device. Each entry may include an IP address of a locally connected host and corresponding forwarding information for the locally connected host. When a packet arrives at the packet forwarding device, a lookup may be performed in the layer 3 host table based on the destination IP address in the packet. If a matching entry is located, the corresponding packet forwarding information is extracted from the layer 3 host table and used to forward the packet to the destination host. If an entry is not located, a miss occurs, and a slower lookup is performed using software.

Another type of table that may be maintained in a layer 3 packet forwarding device is a longest prefix matching (LPM) table. Each entry in a longest prefix matching table may include a subnet address and a subnet mask to be applied to destination IP addresses of incoming packets. When a packet is received, the subnet mask for each entry in the LPM table is applied to the destination IP address of the packet, and the masked address searched in the table. The entry with the longest prefix that matches the masked address in the received packet is used to extract next hop address information for the packet. Using an LPM table allows remote hosts to be identified by next hops without requiring entries in the LPM table for each individual remote host.

One problem with conventional packet forwarding devices is that space for the LPM and host tables is limited. For example, both tables are typically implemented in hardware to increase the number of hosts covered by hardware forwarding and therefore packet forwarding lookup speed. LPM tables are typically populated based on participation in routing protocols, such as routing information protocol (RIP), border gateway protocol (BGP) or open shortest path first (OSPF). When an LPM table becomes full, entries for remote hosts can be placed in the host table. However, the host table can also become full. When this occurs, packets received for destinations that are not present in the LPM or host tables must be forwarded using software, which results in longer lookup times.

In order to increase the routing efficiency of a layer 3 packet forwarding device, older entries in LPM and host tables may be replaced with newer entries. Conventionally, the replacement criteria for an entry include a least recently used (LRU) algorithm. That is, a host table entry that was used least recently may be replaced with a new entry for which a packet forwarding lookup fails. One problem with using an LRU algorithm to replace host table entries is that it is based on individual packets, which may result in excessive replacement of entries in the host table. For example, each time a miss occurs, an entry in the host table may be replaced. Such excessive replacement is undesired because replacing entries in the host table may be a processor intensive operation that requires a software copy of the host table be copied to hardware.

Another problem associated with using an LRU algorithm to replace entries in the host table is that such an algorithm does not take into account the volume of packets addressed to a destination. For example, an entry that was used 1000 times during a time interval more than one minute ago may be replaced by an entry that was used only once in the last minute. The high-volume entry may be more likely to be utilized in the future with a high volume than the low-volume entry. Thus, if the high-volume entry is replaced by the low-volume entry, multiple misses may occur before the high-volume entry can be re-added to the host table.

Accordingly, in light of these difficulties associated with conventional layer 3 packet forwarding devices, there exists a need for methods, systems, and computer program products for controlling updating of a layer 3 host table based on packet forwarding miss counts.

Again, packet forwarding devices, such as layer 3 or Internet protocol (IP) routers, typically use one or more tables to store packet forwarding information. Typically, packet forwarding devices include one or more hardware-implemented tables in addition to software-implemented tables in order to reduce packet forwarding information lookup time. For example, layer 3 packet forwarding devices may include a hardware-implemented host table populated with entries corresponding to individual hosts. When a packet arrives at a layer 3 packet forwarding device, a lookup may first be performed in the hardware host table. If the lookup is successful, the packet may be forwarded to a host corresponding to the matching entry in the table. If the lookup in the hardware host table fails to locate a match, a lookup may be performed in a longest prefix matching (LPM) table to locate the entry with the longest prefix that matches the address in the received packet. If the lookup in the LPM table fails to locate a longest prefix match, a software routing table may be searched in order to successfully forward the packet.

In some implementations, a hardware-implemented host table stores entries corresponding to hosts directly connected to the packet forwarding device. Each entry in the host table may include an IP address of a locally connected host and corresponding forwarding information. When a layer 3 packet arrives at the packet forwarding device, a lookup may be performed in the host table based on the destination IP address in the packet. This lookup is typically performed using a hashing function that identifies matching entries using a search key. If a matching entry is located, the corresponding packet forwarding information is extracted from the host table and used to forward the packet to the destination host. Host tables are typically searched before other tables because they store the most specific forwarding information for layer 3 packets.

A hardware-implemented LPM table stores subnet addresses and subnet masks to be applied to destination IP addresses of incoming packets. When a layer 3 packet is received, logical steps may be performed by a packet forwarding device where the subnet mask for each entry in the LPM table is applied to the destination IP address of the packet, and the masked address is searched in the table. In some implementations, these steps may be performed in a single LPM lookup using a special data structure, such as a Radix tree. The entry with the longest prefix that matches the masked address in the received packet is used to extract next hop address information for the packet. The next hop address typically corresponds to the next hop or machine in a path through which a remote host corresponding to the destination IP address in the packet is reachable. Using an LPM table allows remote hosts to be identified by next hops without requiring entries in the LPM table for each individual remote host. Thus, LPM tables may reduce a large number of hosts into fewer route entries by combining entries with the same next hop information. This allows an LPM table to store matching entries for more hosts than a host table of the same size.

Software lookups are performed by searching a much larger software table that stores layer 3 packet forwarding information. Lookups performed in software are significantly slower than lookups performed in hardware and therefore, it is desirable to perform as few lookups in software as possible.

As stated above, both host and LPM tables may be implemented or stored in hardware of a layer 3 packet forwarding device. In some implementations, the memory space available for both tables is shared. In order to increase the routing efficiency of conventional layer 3 packet forwarding devices, the relative sizes of the host and LPM tables are based on the expected number of communicating IP hosts. For example, edge devices that connect to a small number of hosts may utilize more memory for the host table and less for the LPM table. Devices, referred to as aggregators, that serve many communicating IP hosts may utilize more memory for the LPM table and less for the host table. Aggregators typically connect numerous smaller devices to a network infrastructure backbone or core network device and therefore route packets for a large number of hosts.

In edge devices, it may be desirable to route packets primarily using a host table, since the size of the host table would be small. In aggregators, it may be desirable to route packets primarily using an LPM table, since its entries represent plural hosts and populating a host table with all possible hosts would result in a table size that exceeds available memory space.

Layer 3 packet forwarding devices may have multiple modules, each containing host and LPM tables, for forwarding layer 3 packets. Conventionally, these modules are programmed identically and contain identical host and LPM tables as described above. However, as described above, it may be desirable to route some packets primarily using a host table and others primarily using an LPM table. Conventional IP packet forwarding devices do not provide for such varied operation.

Accordingly, there exists a need for improved methods, systems, and computer program products for routing layer 3 packets.

BRIEF DESCRIPTION OF THE DRAWINGS

Embodiments of the subject matter described herein will now be explained with reference to the accompanying drawings of which:

FIGS. 7A-7C are exemplary host and LPM tables operated in host mode, LPM mode, and hybrid mode according to an embodiment of the subject matter described herein.

DETAILED DESCRIPTION

U.S. Patent Application Ser. No. 11/317,665

According to one aspect, the subject matter described herein includes a method for controlling updating of a layer 3 host table based on packet forwarding lookup miss counts. The method includes routing layer 3 packets using at least one of a host table containing entries corresponding to local and remote hosts and a longest prefix matching (LPM) table containing remote host prefixes. For each layer 3 destination address for which a lookup in the host table and/or the LPM table fails, a number of packets received within a time period may be counted. Based on the counts, remote destination entries in the host table may be replaced. In one exemplary implementation, the remote destination entries in the host table may be replaced with remote destination entries whose miss counts are greater than or equal to those in the host table and whose miss counts meet or exceed a threshold during a measurement interval. It may be desirable to replace a remote destination entry in the host table only when the miss count for the destination being considered to replace the entry in the host table exceeds the miss count of the host table entry and the threshold, rather than when miss count is greater than or equal to the miss count for the host table entry and the threshold, to avoid thrashing.

The subject matter described herein for controlling updating of a layer 3 host table may be implemented in hardware, software, firmware, or any combination thereof. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be implemented on a single device or computing platform or may be distributed across multiple devices or computing platforms.

Figure 1:
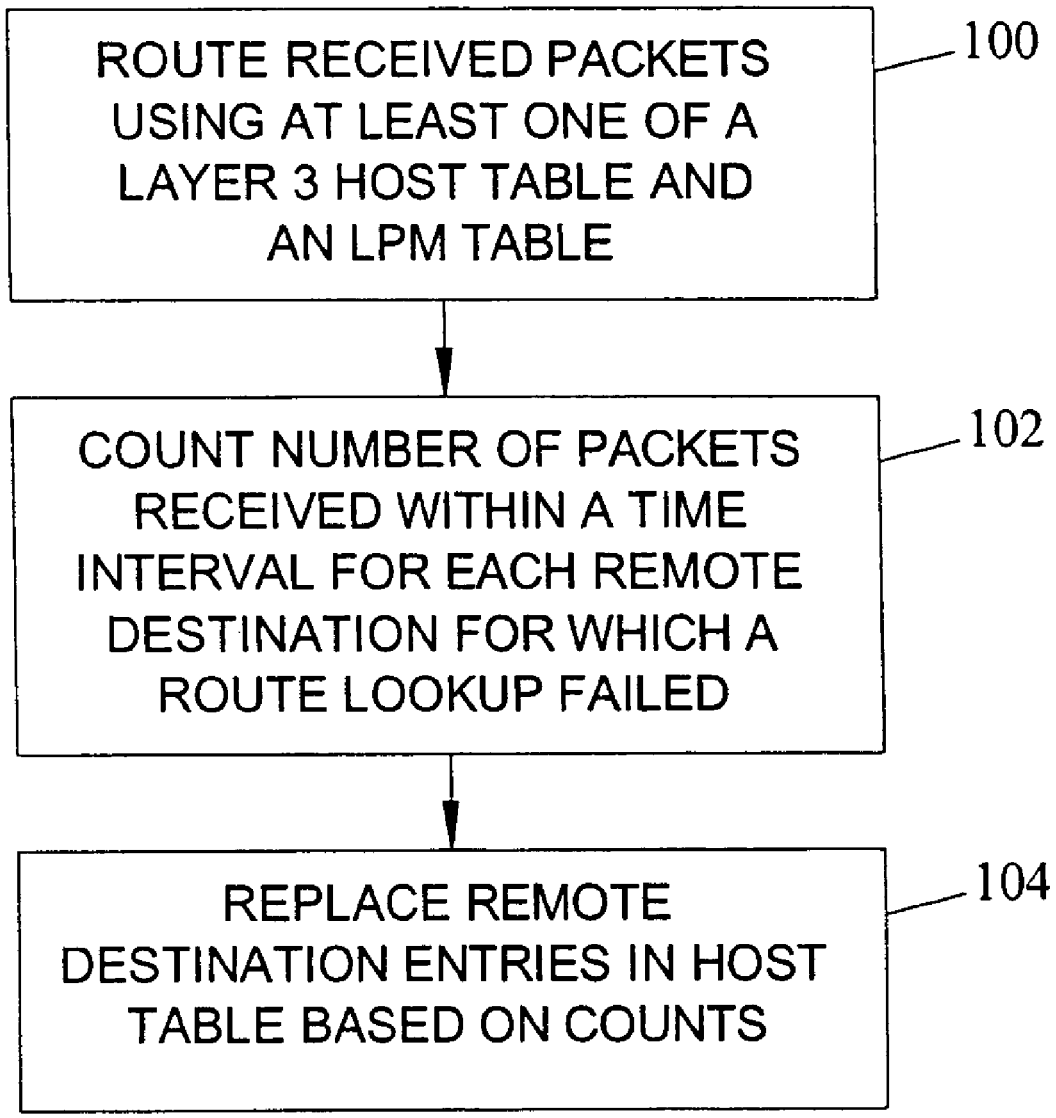
FIG. 1 is a flow chart illustrating an exemplary process for controlling updating of a layer 3 host table based on packet forwarding lookup miss counts according to an embodiment of the subject matter described herein.

FIG. 1 is a flow chart illustrating exemplary steps of a process for controlling updating of a layer 3 host table based on packet forwarding lookup miss counts according to an embodiment of the subject matter described herein. Referring to FIG. 1, in step 100, packets received at a layer 3 packet forwarding device are routed using at least one of a layer 3 host table and an LPM table. In one exemplary implementation, both a host table and an LPM table may be included, and lookups may first be performed in a host table, because the host table contains more specific information than the LPM table. If the lookup in the LPM table fails to result in a matching entry, a lookup may be performed in the LPM table. If the lookup in the host and LPM tables fails, a miss occurs, and the lookup must be performed in software. Exemplary hardware and software for performing layer 3 address lookups will be described in detail below. In an alternate implementation, a layer 3 forwarding device may include a host table with entries for remote hosts and may not include an LPM table. In such an implementation, when a lookup in the host table fails, a software lookup may be performed.

In step 102, for each destination for which a route lookup failed, the number of packets received within a time interval is counted. For example, if a lookup fails in both the host table and the LPM table or in the host table in a host-table-only implementation, the route lookup fails, and a lookup must be performed using software. The failure to route a packet in hardware is referred to herein as a miss. For each destination for which a miss occurs, a count is recorded. Counts may be maintained on a per destination basis. The number of hosts for which miss counts are maintained during a time interval may be limited to a maximum number to conserve memory and reduce search time. In step 104, remote destination entries in the host table are replaced based on the counts. Step 104 may be performed when the area in the host table for storing remote destination entries is full. When this occurs, it may be desirable to replace entries for destinations in the host table with lower counts than destinations that have not been written to the host table with higher miss counts. It may also be desirable to require that entries be replaced only if the remote destination entries that have not been added to the host table exceed a threshold miss count value to avoid excessive replacements. It may further be desirable to take into account the age of entries in the host table. An exemplary process for replacing entries based on counts will be described in more detail below.

Figure 2:
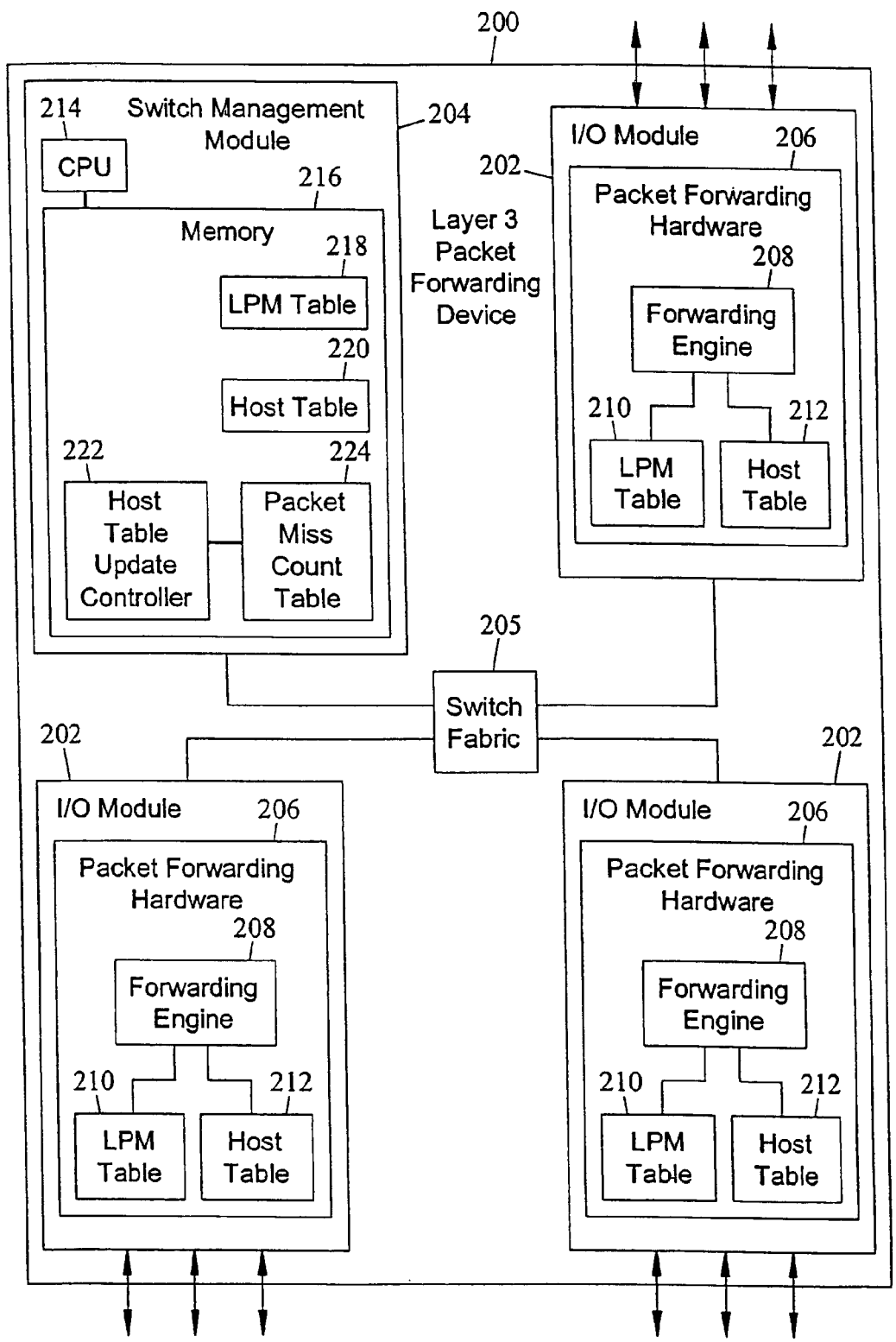
FIG. 2 is a block diagram of a layer 3 packet forwarding device that controls layer 3 host table updating based on packet forwarding lookup miss counts according to an embodiment of the subject matter described herein.

FIG. 2 is a block diagram illustrating exemplary components of a layer 3 packet forwarding device including a system for controlling updating of a layer 3 host table according to an embodiment of the subject matter described herein. Referring to FIG. 2, packet forwarding device 200 includes a plurality of input/output (I/O) modules 202, a switch management module 204, and a switch fabric 205. I/O modules 202 each include packet forwarding hardware 206. Packet forwarding hardware 206 includes a forwarding engine 208, a longest prefix matching (LPM) table 210, and a host table 212. In the illustrated example, packet forwarding engine 208 performs lookups in host table 212 and LPM table 210 to route packets. LPM table 210 may be any suitable table that includes remote host prefixes and corresponding next hop addresses. In an alternate example, LPM table 210 may be omitted, and packet forwarding device 200 may perform lookups in host table 212.

An example of an entry in LPM table 210 is as follows:

TABLE 1

Exemplary LPM Table Entry

| Subnet/Length | Gateway IP Address | VLAN | Port |
|---|---|---|---|
| 128.160.0.0/16 | 194.162.1.1 | 3 | 1 |

In the LPM table entry illustrated above, the first column contains the subnet and mask length to be applied to incoming packets. The second column includes the IP address of a gateway connected to the remote subnet. The next column includes a VLAN tag to be applied to packets sent to the subnet. The final column specifies a port in the packet forwarding device to which the layer 3 packet should be forwarded. It should be noted that the gateway IP address may be used to locate a layer 2 address corresponding to the gateway. In addition, it should also be noted that the structure for the LPM table entry illustrated in Table 1 is merely an example of information that may be used to forward a packet. Fields may be added, deleted, or replaced without departing from the scope of the subject matter described herein. In addition, the fields in Table 1 may be distributed across multiple tables without departing from the scope of the subject matter described herein.

Table 2 shown below illustrates an example of an exemplary layer 3 host table entry.

TABLE 2

Exemplary Layer 3 Host Table Entry

| Host IP Address | Locally Attached? | Multicast? | VLAN | MAC Table Count Index | Packet | Birth |
|---|---|---|---|---|---|---|
| 128.156.0.1 | N | N | 3 | MAC 5 | 100 | 11/29/05, 09:00 |

In the exemplary layer 3 host table entry, the first column stores a 32 bit destination host IP address. For IP version 6, the width of the first column or field may be extended to handle bit lengths corresponding to IPv6 addresses. The next column indicates whether the host is locally attached or not. The next column indicates whether the address is a multicast address or not. In the illustrated example, the host is not locally attached and the address is not a multicast address. The next column specifies the VLAN tag to be added to packets sent to the remote host. The next column stores an index to a MAC table which stores the MAC address of the gateway through which the remote host is reachable.

The next two columns in the host table store information that is useful in controlling updating of the host table. For example, the packet count field stores a count of 100, and the birth field indicates that the entry was added at 09:00 on Nov., 29, 2005. In one exemplary implementation, the packet count field may indicate the number of misses that occurred for the destination IP address in the first field of the entry during a predetermined measurement period before the entry was added to the table. For example, a packet count of 100 may indicate that 100 misses occurred during the measurement interval. In an alternate implementation, the packet count field may contain a packet count that indicates the number of times the entry has been used within a moving time interval. For example, the packet count filed may indicate that the entry was used 100 times within the last minute. The birth field indicates the time that the entry was added to the host table and may be used along with the packet count to determine whether to replace the entry. As with Table 1, fields in the host table may be replaced, deleted, or distributed across multiple tables without departing from the scope of the subject matter described herein.

Switch management module 204 includes a central processing unit 214 and a memory 216. CPU 214 controls the overall operation of layer 3 packet forwarding device 200. In addition, CPU 214 controls updating of LPM table 210 and host table 212 maintained by each I/O module.

In the illustrated example, memory 216 stores an LPM table 218 and a host table 220. LPM table 218 may include a copy of LPM table 210 maintained in hardware plus any additional entries that have been learned and not populated to hardware. Similarly, host table 220 may include a copy of host table 212 maintained in hardware plus any additional entries that have been learned and not populated to hardware. In order to construct LPM table 218, CPU 214 may execute routing protocol software, such as BGP, OSPF or RIP software.

In order to update host table 220, CPU 214 may execute software, referred to herein as host table update controller 222. Host table update controller 222 maintains a count of packet forwarding lookup misses that are required to be looked up by CPU 214 in LPM table 218 and host table 220. As described above, tables 218 and 220 may include entries that have been learned but that have not been populated to hardware. When a miss occurs using packet forwarding hardware 206 on one of the I/O modules 202, the packet may be forwarded to switch management module 204 for forwarding. Switch management module 204 performs a lookup in LPM table 218 and host table 220 and forwards the packet. Host table update controller 222 maintains a packet miss count table 214 to track the number of packets for which packet forwarding hardware lookups resulted in a miss. Host table update controller 222 may control updating of entries and host table 212 based on the miss counts.

Figure 3A:
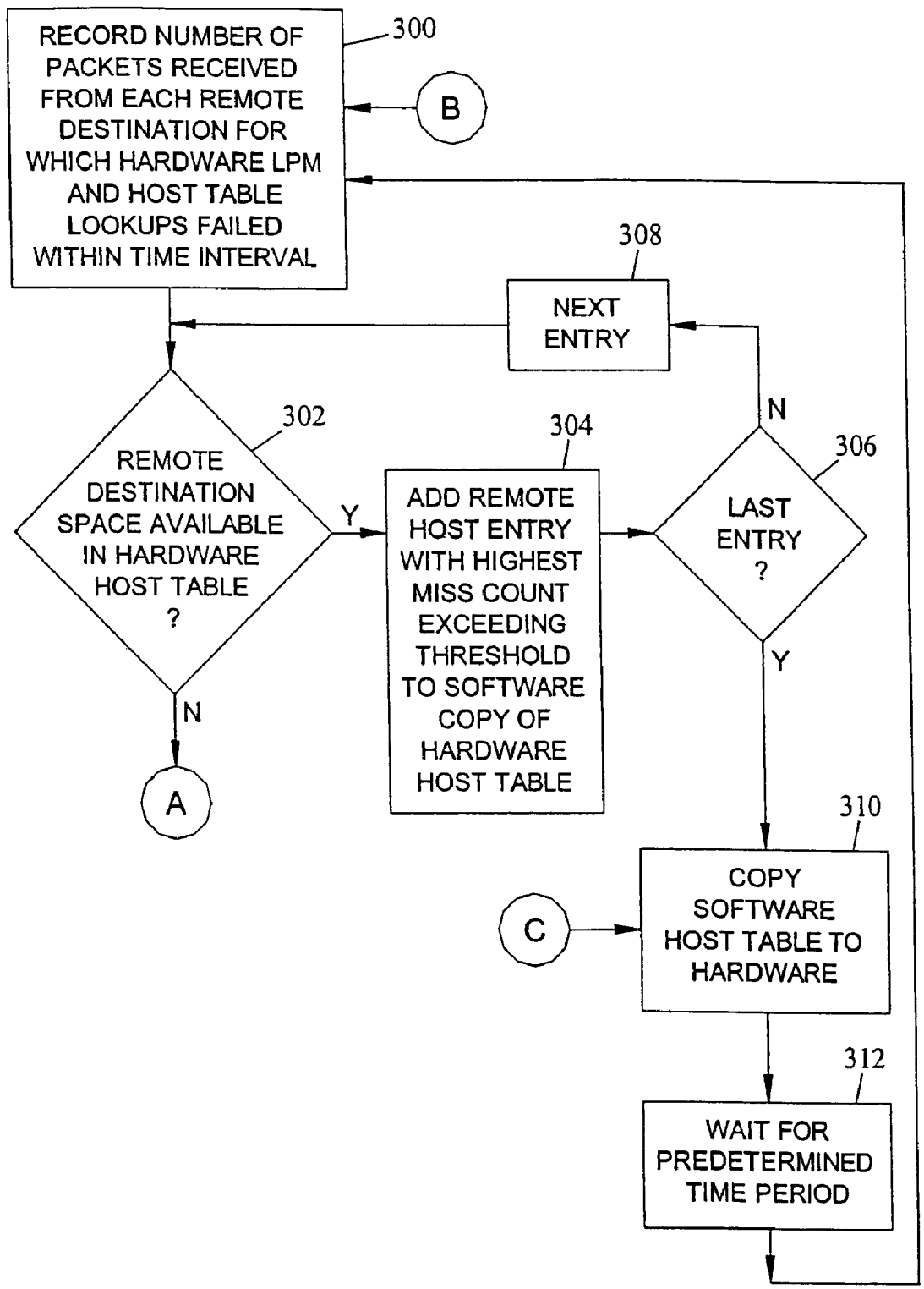
FIGS. 3A and 3B are a flow chart illustrating an exemplary process for controlling updating of a layer 3 packet forwarding host table according to an embodiment of the subject matter described herein.
Figure 3B:
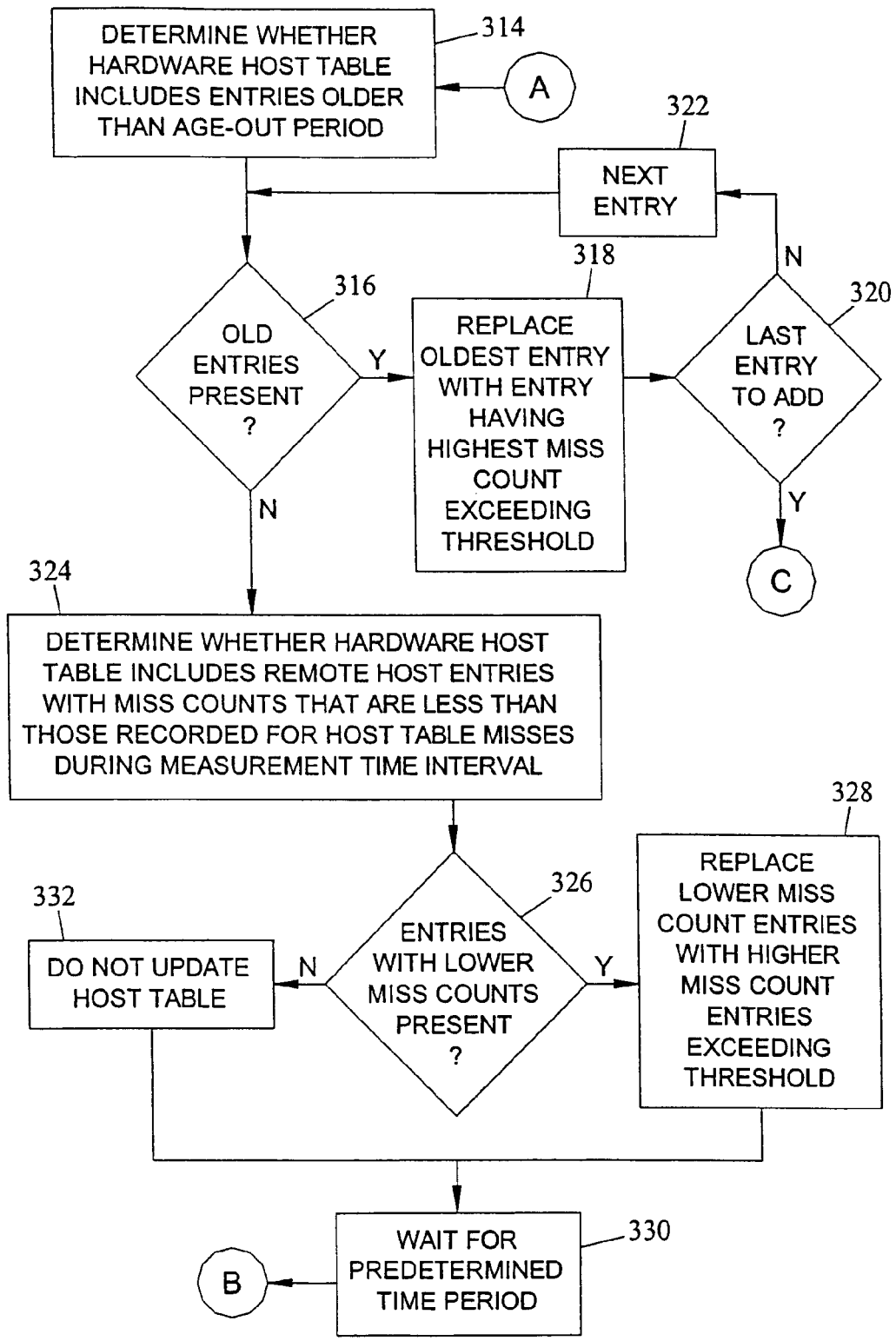

FIGS. 3A and 3B are a flow chart illustrating exemplary steps that may be implemented by layer 3 packet forwarding device 200 illustrated in FIG. 2 in controlling updating of host table entries based on packet forwarding lookup miss counts according to an embodiment of the subject matter described herein. Referring to FIG. 3A, in step 300 host table update controller 222 records a number of packets received for each remote destination for which a hardware host and LPM table lookup failed within a time interval. In an implementation with a host table only, step 300 would include counting host table misses. In one implementation, misses for each destination may be counted during one second time intervals that are spaced apart by ten seconds. One reason for spacing the miss count recording intervals is that counting the number of packets for each destination may be processor intensive and CPU 214 may need to be free to perform other tasks. For each received packet for which a miss occurs, host table update controller 222 determines whether an entry exists for the destination of the packet in packet miss count table 224. If an entry exists, host table update controller may increment the miss count for the entry. If an entry does not exist, host table update controller 222 may create an entry in packet miss count table 224 for the destination and set the packet miss count to one.

Once the time interval has expired, control proceeds to step 302 where it is determined whether remote destination space is available in the hardware host table. For example, hardware host tables 212 may have a certain number of space allocated for remote host entries. Host table update controller 222 may be configured to know and keep track of the amount of space in host tables 212. Entries for locally connected hosts and multicast routes are preferably given priority over entries for remote hosts. Accordingly, in step 302, if space is available for a remote host in a hardware host table, control proceeds to step 304 where the remote host entry with the highest count exceeding an operator defined miss count threshold is added to software host table 220. Defining a miss count threshold prevents packets with a small number of misses from triggering a host table update. Once the entry is added, it is then determined whether this was the last entry present in the miss count table (step 306). If this was not the last entry, control proceeds to step 308 where the next entry in the packet miss count table is examined. Steps 302-308 are repeated until all of the entries from the miss count table whose miss counts exceed the threshold have been added to the software copy of the host table or when the remote destination space in the host table becomes full.

Returning to step 306, if the last entry from the packet miss count table has been added to the software copy of the host table and the host table is not full, control proceeds to step 308 where the software copy of the host table is copied to hardware. In step 312, host table update controller 222 waits for the next recording interval and returns to step 300 to begin recording miss counts.

Returning to step 302, if remote destination space is not available in the hardware host table, control proceeds to step 314 illustrated in FIG. 3B. In step 314, host table update controller 222 determines whether the hardware host table contains entries that are older than the age-out period. In one exemplary implementation, the age-out period may be set to ten minutes. The age-out period may be measured from the time when an entry is added to the host table. In step 316, if old entries, i.e., entries older than the age-out period, are present in the host table, control proceeds to step 318 where the oldest entry in the host table is replaced with the entry in the packet miss count table having the highest miss count exceeding the miss count threshold. In step 320, it is determined whether the current entry in the packet miss count table is the last entry to add. For example, as discussed above, it may only be desirable to add entries that have at least a threshold number of miss counts. The number of entries that are to be replaced may be determined based on the number of destinations having miss counts that meet or exceed the threshold. If it is determined that the current entry is not the last entry to add, control proceeds to step 322 where the next entry in the packet miss count table is examined. Steps 316-322 are repeated until all of the old entries in the host table have been replaced by entries whose miss counts meet or exceed the miss count threshold.

Returning to step 320, if it is determined that all entries have been added to the host table, control proceeds to steps 310 in FIG. 3A where the software copy of the host table is copied to hardware. In step 312, host table update controller 222 waits for a predetermined time interval and re-starts the counting of host table lookup misses.

Returning to step 316, if it is determined that old entries are not present, control proceeds to step 324 where it is determined whether the hardware host table includes remote host entries with packet miss counts less than those recorded for host table misses during the time interval. This step may include comparing the miss counts for destinations recorded in the miss count table to miss counts of entries in the packet forwarding host table. In step 326, if entries with lower miss counts are present in the host table, control proceeds to step 328 where lower miss count entries in the host table are replaced with higher miss count entries. Again, replacement may be performed for destinations whose miss counts exceed a predetermined threshold. Control then proceeds to step 330 where host table update controller 222 waits for a predetermined time period before returning to step 300 illustrated in FIG. 3A. In step 326, if entries with lower miss counts are not present in the host table, control proceeds to step 332 where the host table is not updated. Control then proceeds to step 330 or host table update controller 222 waits for a predetermined time period and returns to step 300 to repeat the process.

Although in the example illustrated in FIG. 3B, miss counts are stored for each entry present in the host table. In an alternate implementation, usage counts, indicating how many times an entry has been used, may be stored and updated for each host table entry. The usage counts may be compared with miss counts to determine whether or not to replace host table entries. In one exemplary implementation, the usage counts may be maintained by packet forwarding hardware 206 illustrated in FIG. 2 such that each I/O module contains a real time or near real time count of its host table entry usage. In such an implementation, host table update controller 222 may include a component that exists in packet forwarding hardware 206 to maintain the usage counts and a component that executes on the switch management module or on the individual I/O modules to maintain miss counts, compare the miss counts to the usage counts, and replace entries in the host table with entries according to the miss counts if the miss counts exceed the usage counts and a threshold number of miss counts.

U.S. Patent Application Ser. No. 11/644,701

The subject matter described herein includes methods, systems, and computer program products for routing packets at a multi-mode layer 3 packet forwarding device. According to one aspect, the subject matter described herein includes operating a first of at least two modules in a host mode, and operating a second of at least two modules in a longest prefix matching (LPM) mode. Operating a module in a host mode includes populating a host table and an LPM table with entries corresponding to hosts and routing layer 3 packets received by the first module using the host and LPM tables. Operating a module in an LPM mode includes populating a host table with entries corresponding to hosts, populating an LPM table with entries corresponding to variable length Internet protocol (IP) addresses and next hop addresses, and routing layer 3 packets received by the second module using the host and LPM tables.

The subject matter described herein for routing packets at a multi-mode layer 3 packet forwarding device may be implemented in hardware, software, firmware, or any combination thereof. The subject matter described herein may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be implemented on a single device or computing platform or may be distributed across multiple devices or computing platforms.

Figure 4:
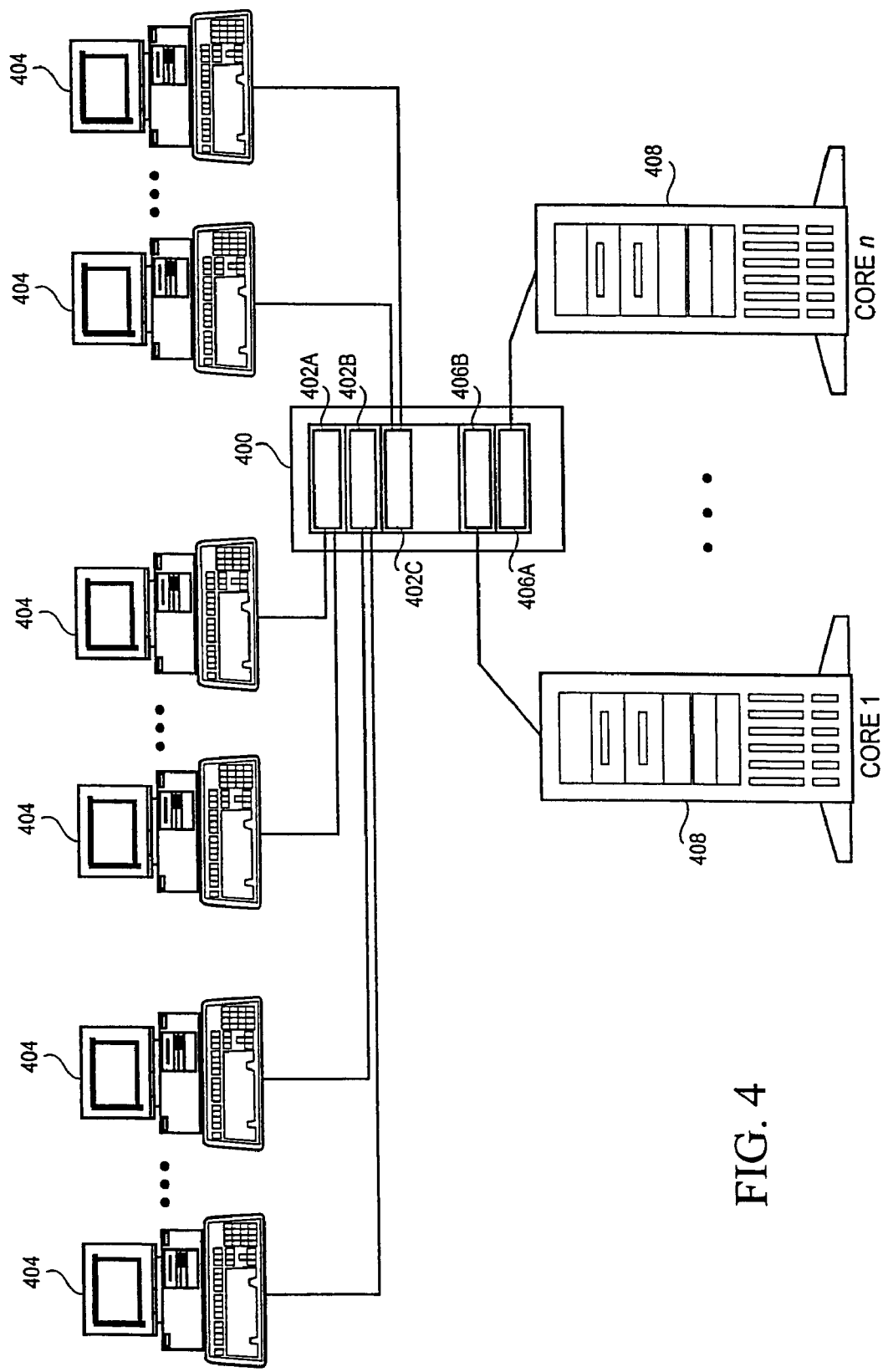
FIG. 4 is a network diagram illustrating a multi-mode layer 3 packet forwarding device including edge modules connected to multiple end terminal devices and aggregator modules connected to one or more core network devices according to an embodiment of the subject matter described herein.

FIG. 4 is a network diagram illustrating a multi-mode layer 3 packet forwarding device including edge modules connected to multiple end terminal devices and aggregator modules connected to one or more core network devices according to an embodiment of the subject matter described herein. Referring to FIG. 4, layer 3 packet forwarding device 400 may include one or more I/O modules, where each I/O module includes a host table and an LPM table implemented in hardware for increased table lookup speed. For example, packet forwarding device 400 may include edge modules 402A-402C connected to end terminals 404, which represent a relatively small number of communicating hosts. In one embodiment, edge modules 402A-402C each include a host table and an LPM table, where both tables may include entries corresponding to directly connected hosts. Aggregator modules 406A and 406B connect to one or more core network devices 408 and therefore handle a much larger traffic volume than edge modules 402A-402C. Aggregator modules 406A and 406B may each include LPM tables with entries corresponding to variable length address prefixes and next hops for reaching destinations. Aggregator modules 406A and 406B may also include host tables for directly connected hosts. Modules 402A-402C, 406A and 406B may be operated in multiple different modes. For example, in one possible implementation of packet forwarding device 400 that includes three edge modules 402A-402C and two aggregator modules 406A and 406B, edge modules 402A-402C and may be operated in a host mode and, aggregator modules 406A and 406B may be operated in LPM mode. In this way, a single layer 3 packet forwarding device can be tuned to efficiently forward packets for both large and small numbers of communicating hosts. The modes will be described in further detail below.

Figure 5:
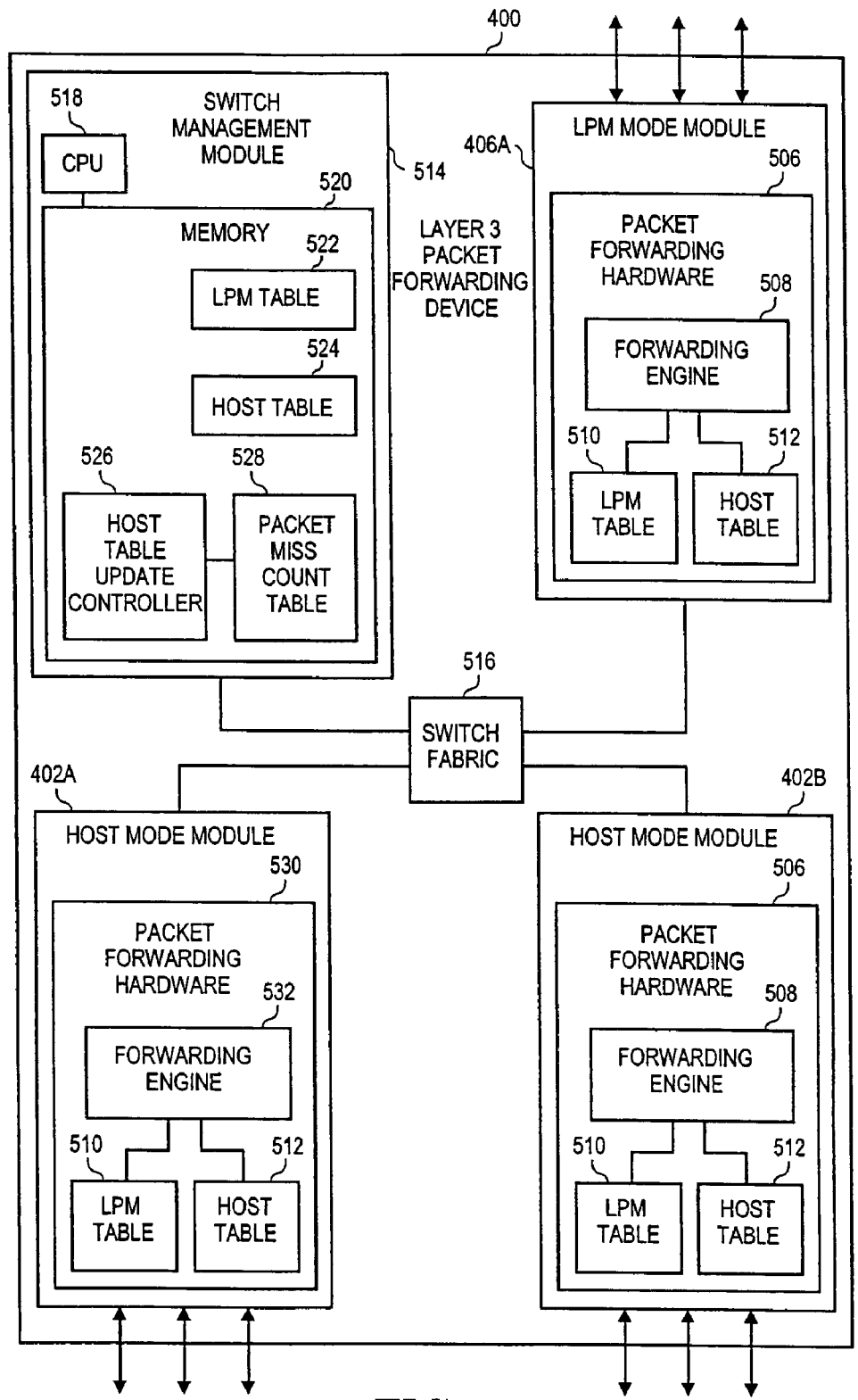
FIG. 5 is a block diagram illustrating exemplary components of a multi-mode layer 3 packet forwarding device that routes layer 3 packets including modules operating in a host mode, an LPM mode, and a hybrid mode according to an embodiment of the subject matter described herein.

In one exemplary implementation, the mode of each module depends on how it is provisioned in light of its expected utilization as an edge module, an aggregator module, or a module that processes an amount of traffic in between the amount processed by an edge and an aggregator module. In FIG. 5, for example, modules 402A, 402B, and 406A operate in a mode based on the how LPM tables 510 are provisioned. For example, LPM table 510 and host tables 512 located on module 402A may be populated with full-length 32 or 128 bit host entries, and therefore both LPM table 510 located on module 402A and module 402A operate in a host mode. The tables located on module 402B may be provisioned similarly to those located on module 402A. Hence, module 402B may also operate in host mode. Module 406A includes a host table 512 with a small number of entries corresponding to directly connected hosts and a larger LPM table 510 with variable length prefixes and next hop addresses. Hence, module 106A may operate in LPM mode. A third I/O module (not shown in FIG. 5) may operate in a hybrid mode where the host table has full address entries for directly connected hosts and the LPM table has some entries with variable length prefixes and others with full host addresses.

In addition to I/O modules, multimode packet forwarding device 400 illustrated in FIG. 5 includes a switch management module 514 and a switch fabric 516. Switch management module 514 controls the overall operation of modules 402A, 402B, and 406A. In addition, switch management module 514 includes a CPU 518 that controls its operation and a memory 520 that stores software implemented host and LPM tables. In particular, memory 520 includes an LPM table 522 that includes copies of all of the entries in LPM tables 510 maintained by the individual I/O modules. Host table 524 may contain copies of all of the entries in host tables 512 maintained by the individual I/O modules. Tables 522 and 524 may also include entries that have been learned through participation in routing protocols that are not present on the individual I/O modules. Switch management module 514 also includes a host table update controller 526 that controls the updating of host tables 512 maintained by the I/O modules in a packet miss count table 528 that facilitates this updating. Switch fabric 516 switches packets between I/O modules 402A, 402B, and 406A and switch management module 514.

As stated above, one type of entry that may be included in an LPM table is a variable length IP address prefix. Table 1 shown below illustrates an example of a variable length IP address prefix entry that may be included in an LPM table.

TABLE 1

Exemplary LPM Table Entry

| Subnet/Length | Gateway IP Address | VLAN | Port |
| --- | --- | --- | --- |
| 128.160.0.0/16 | 194.162.1.1 | 3 | 1 |

In the LPM table entry illustrated above, the first column contains the subnet and mask length to be applied to incoming packets. The second column includes the IP address of a gateway connected to the remote subnet. The next column includes a virtual local area network (VLAN) tag to be applied to packets sent to the subnet. The final column specifies a port in the packet forwarding device to which the layer 3 packet should be forwarded. It should be noted that the gateway IP address may be used to locate a layer 2 address corresponding to the gateway. In addition, it should also be noted that the structure for the LPM table entry illustrated in Table 1 is merely an example of information that may be used to forward a packet. Fields may be added, deleted, or replaced without departing from the scope of the subject matter described herein. In addition, the fields in Table 1 may be distributed across multiple tables without departing from the scope of the subject matter described herein.

As stated above, another type of entry that may be included in a host or LPM table is a full IP address entry. Table 2 shown below illustrates an exemplary full IP address entry that may be included in a host table or an LPM table according to an embodiment of the subject matter described herein.

TABLE 2

Exemplary Layer 3 Host Table Entry

| Host IP Address | Locally Attached? | Multi-cast? | VLAN | MAC Table Count Index | Packet | Birth |
| --- | --- | --- | --- | --- | --- | --- |
| 128.156.0.1 | N | N | 3 | MAC 5 | 100 | 11/29/05, 09:00 |

In the exemplary layer 3 host table entry, the first column stores a 32 bit destination host IP address for IPv4 addresses. For IP version 6 addresses, the width of the first column or field may be extended to handle 128 bit length corresponding to IPv6 addresses. The next column indicates whether the host is locally attached. The next column indicates whether the address is a multicast address. In the illustrated example, the host is not locally attached and the address is not a multicast address. The next column specifies the VLAN tag to be added to packets sent to the remote host. The next column stores an index to a media access control (MAC) address table which stores the MAC address of the gateway through which the remote host is reachable.

The next two columns in the host table store information that is useful for updating a host table. The birth field indicates the time that the entry was added to the host table and may be used along with the packet count to determine whether to replace the entry. The hit bit field is a binary value that indicates whether the entry has been accessed within a preceding predetermined time period. In one possible embodiment, this predetermined time period is the age-out period for entries used to scan host table 512 and LPM table 510 located on modules 402A-406A for old entries. The hit bit may be a user-configurable value corresponding to each remote host entry, and may be used to remove entries in the host and LPM tables. One example of removing entries in the host and LPM tables based on the hit bit is described in FIG. 6C. As with Table 1, fields in the host table may be replaced, deleted, or distributed across multiple tables without departing from the scope of the subject matter described herein.

Data such as that illustrated above in Tables 1 and 2 may be stored in hardware on I/O modules 402A, 402B, and 406A. In the example illustrated in FIG. 5, each I/O module includes hardware 530 that implements a packet forwarding engine 532 and that stores LPM and host tables 510 and 512. In one implementation, packet forwarding engine 532 may first perform a lookup in host table 512 in order to determine where to forward a received packet. If the lookup in host table 512 fails, a lookup will be performed in its local LPM table 510. If a lookup in the local LPM table 510 fails, the packet is forwarded to switch management module 514, which performs lookups in tables 522 or 524 to forward the packet.

As stated above, switch management module 514 includes a host table update controller 526 that controls the updating of host table 524. In one embodiment, host table update controller 526 can maintain a count of packet forwarding lookup misses that are required to be looked up by CPU 518 in LPM table 522 and host table 524. As described above, tables 522 and 524 may include entries that have been learned but that have not been populated to hardware. When a miss occurs using packet forwarding hardware 506 on one of the modules 402A, 402B, and 406A, the packet may be forwarded to switch management module 514 for forwarding. Switch management module 514 performs a lookup in LPM table 522 or host table 524 and forwards the packet. Host table update controller 526 maintains a packet miss count table 528 to track the number of packets for which packet forwarding hardware lookups resulted in a miss. Host table update controller 526 may control updating of entries and host table 512 based on the miss counts.

Figure 6A:
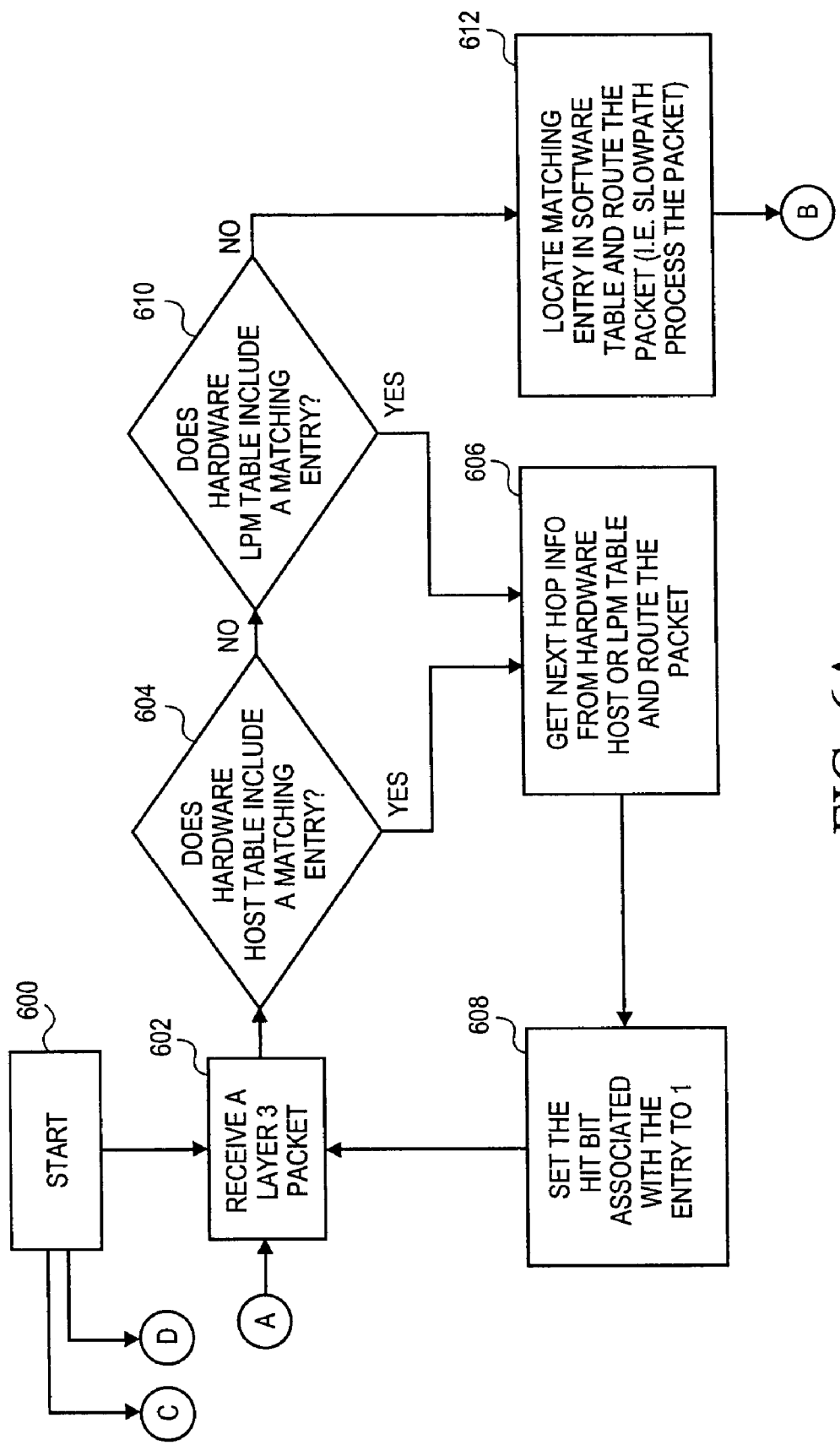
FIGS. 6A-6C are flow charts illustrating exemplary steps for routing packets at a layer 3 packet forwarding device that includes modules that may be operated in host mode, LPM mode, and hybrid mode according to an embodiment of the subject matter described herein.
Figure 6B:
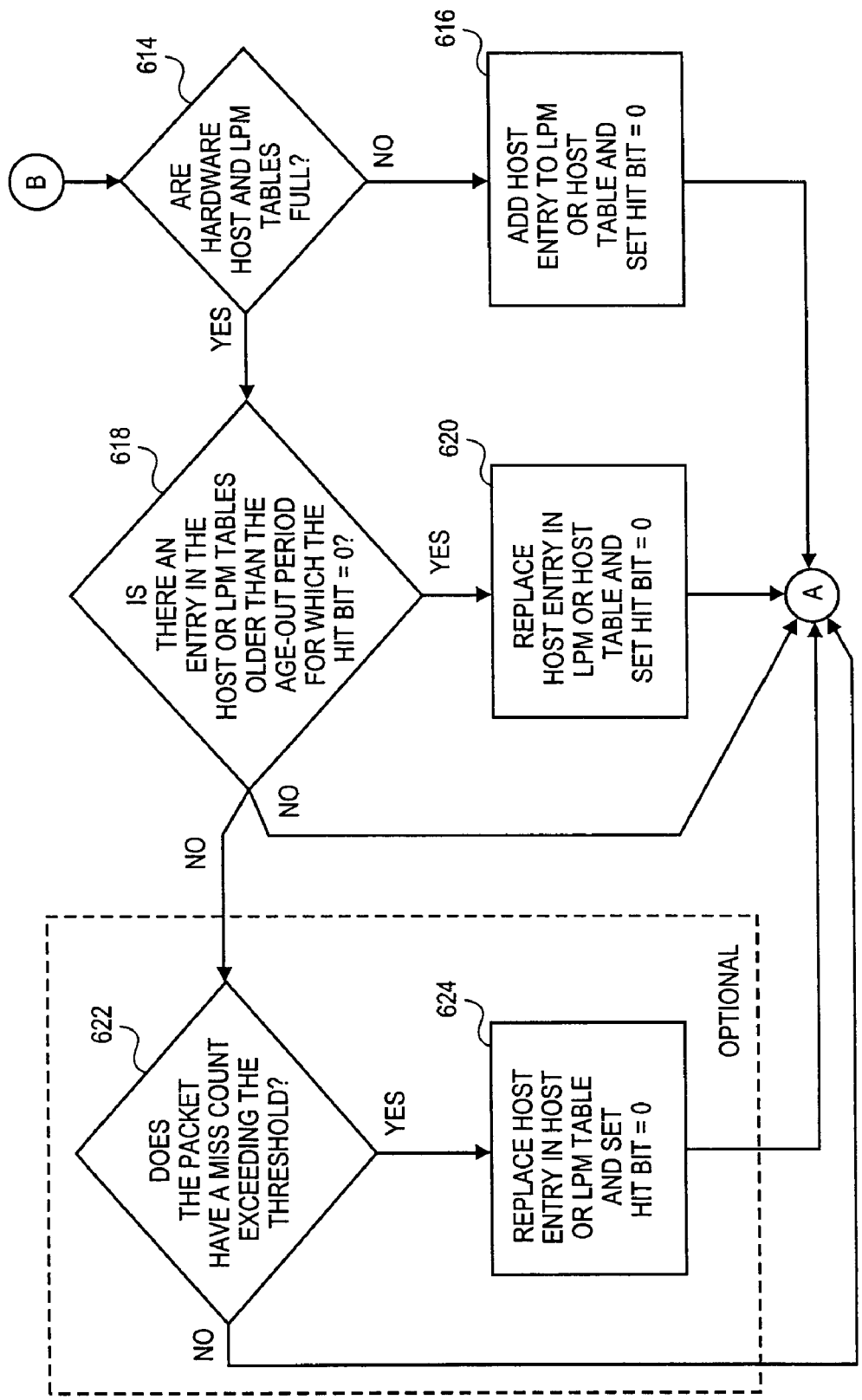
Figure 6C:
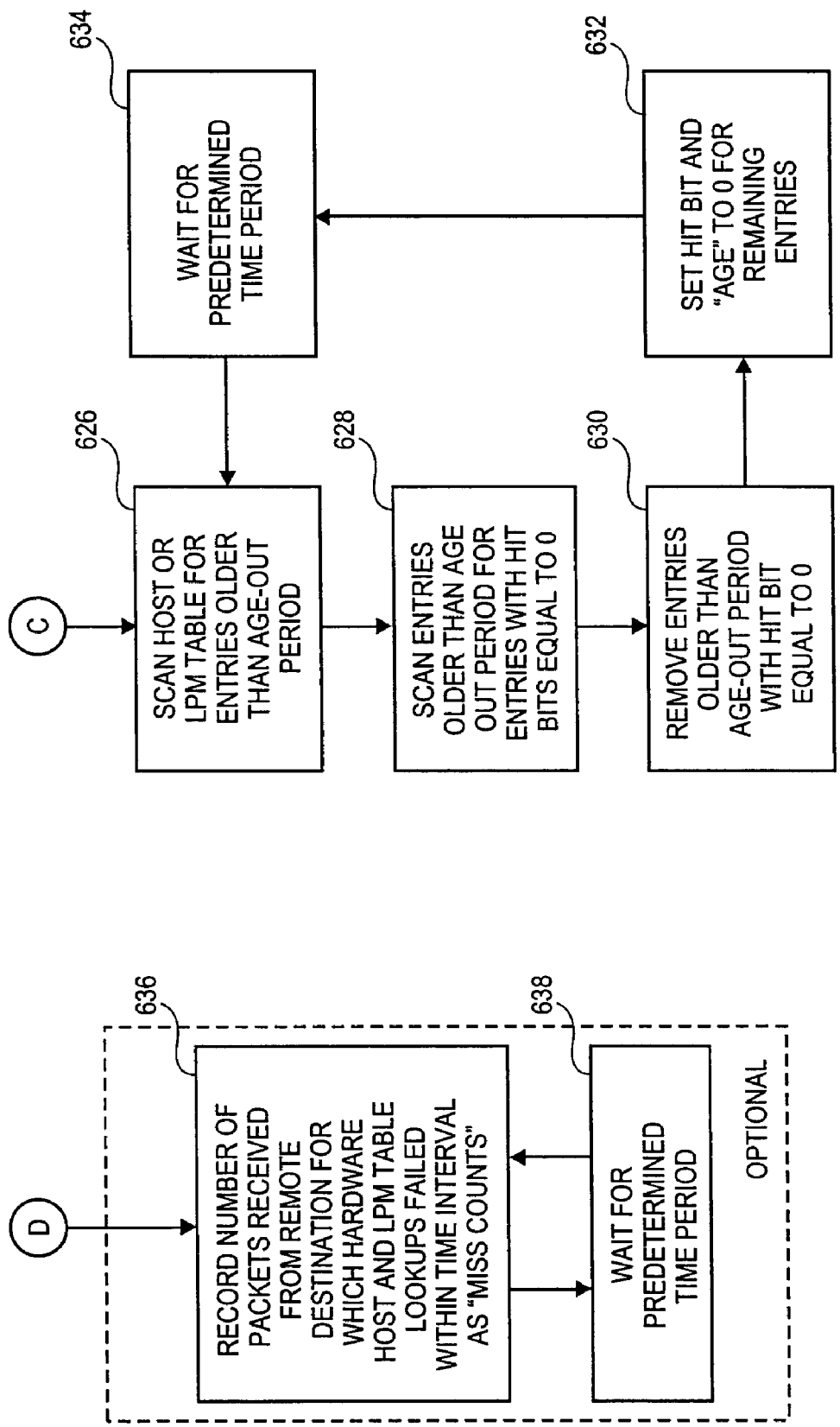

FIGS. 6A-6C are flow charts illustrating exemplary processes for routing packets at a layer 3 packet forwarding device that includes modules that may be operated in host mode, LPM mode, and hybrid mode according to an embodiment of the subject matter described herein. The exemplary processes for routing layer 3 packets illustrated in FIGS. 6A-6C may be performed by I/O modules operating in any of the modes described above. FIGS. 6A and 6B illustrate exemplary steps for forwarding layer 3 packets. The steps described in FIGS. 6A and 6B form a continuous loop, where packets are received by a layer 3 packet forwarding device, routed to their destination or next hop, and another packet is received. These steps may utilize information generated by background processes performed simultaneously with the steps described in FIGS. 6A-6B. These background processes are illustrated in FIG. 6C, and may be continuously performed by a layer 3 packet forwarding device in addition to the primary steps required for forwarding packets described in FIGS. 6A-6B.

Referring to FIG. 6A, in step 600, a layer 3 packet forwarding device is initialized, and one or more background processes may automatically begin. Once initialized, the packet forwarding device is ready to receive and forward layer 3 packets. In step 602, a layer 3 packet is received at a layer 3 packet forwarding device where modules may be operated in host mode, LPM mode, or hybrid mode. In order to forward the packet to its destination or next hop, destination information is extracted from the packet and used to first search host table for a matching entry in step 604. In one implementation, a hashing algorithm is used to locate matching entries in the host table. If a matching entry is found, control proceeds to step 606, where next hop information associated with the entry is located and used to route the packet. In step 608, a hit bit associated with the entry is set to a binary value of 1 indicating that a matching entry was found in host table.

Alternatively, in this example, if a matching entry is not found in one of host tables 512 located on modules 402A, 402B, or 406A in step 608, control proceeds to step 610 where the LPM table on the module that received the packet is searched for a matching entry. In one example, the LPM table is operated in host mode on a host-mode module and therefore is populated with full fixed-length host entries. Again, if a matching entry is found in the LPM table, next hop information is located and used to route the packet and its hit bit is set to 1 in steps 606-608.

If no matching entry is found in either the hardware-implemented host table 512 or the hardware-implemented LPM table 510 on the module that received the packet, a slower lookup is performed in software using tables 522 and 524, and the result of the lookup is used to route the packet. Unlike layer 3 packets routed using matching entries located in hardware implemented tables, packets routed as the result of a software lookup do not automatically get added to a hardware table with a hit bit equal to 1. Rather, a determination is made in steps 614-620 illustrated in FIG. 6B whether to add the software processed entry to one of hardware tables. In step 614, it is determined whether the entry processed in software in step 612 can be stored in either hardware-implemented table. If space is available, the entry is added to the hardware table in step 616, the hit bit is set to 0, and a next layer 3 packet is received.

If no available space exists in hardware host table 512 or hardware LPM table 510 located on the module that received the packet, it is determined whether to replace an entry in steps 618-620. In step 618, the age of entries is determined by comparing the birth date of each entry, as illustrated in Table 2, to the time tables are scanned. Entries older that the predetermined age-out period with a hit bit equal to 0 are located in step 618 and replaced by a new entry in step 620. If no entry exists that satisfies the replacement criteria described above in either hardware table, no entry is replaced, and a next layer 3 packet is received according to step 602.

In another embodiment, steps 622-624 may be performed in addition to step 620 if an entry is located in the host or LPM tables older than the age-out period for which the hit bit equals 0. In step 622, the miss count of the packet is examined. If the miss count for the packet exceeds a predetermined threshold, it is added to the host or LPM table with a hit bit equal to 0, and an existing entry is replaced in step 624. If the miss count does not exceed the threshold, no entry is replaced in either hardware-implemented table, and control proceeds to step 602.

Referring to FIG. 6C, steps 626-638 illustrate a background process for periodically removing old entries from hardware tables 512 located at module 402A, 402B, and 406A and resetting the hit bits of the remaining entries. In steps 626-634, LPM table 510 and host table 512 located on modules 402A-406A are scanned for entries older than the age out period with hits bits equal to 0. The entries identified in steps 628 are removed from the tables and the hit bits of the remaining entries are set to 0, in steps 630-632. In step 634, a predetermined time period elapses before returning to the scanning process in step 628. Thus, steps 626-634 illustrate a method for ensuring that hardware host and LPM tables are not populated with old and unaccessed entries.

In another implementation, additional steps 636 and 638 may be performed. In steps 636 and 638, host-mode module 402A may periodically record the number of packets received during a time interval for which hardware host and LPM table lookups failed, and a miss occurred. The results of steps 636 and 638 are miss counts associated with entries processed in software in step 612. These miss counts may be used to determine whether or not to replace an entry in one of the hardware tables. As described above, in steps 622-624, a packet that has been processed in software is added to a hardware table if its miss count exceeds a predetermined threshold. Alternatively, if the packet's miss count does not exceed the threshold, it is not added to a hardware table.

Although in the examples illustrated in FIGS. 6A-6C, miss counts may be stored for each entry present in the host table. In an alternate implementation, usage counts (indicating how many times an entry has been used) may be stored and updated for each host table entry. The usage counts may be compared with miss counts to determine whether or not to replace host table entries. In one possible implementation, usage counts may be maintained by packet forwarding hardware 206 illustrated in FIG. 2 such that each module contains a real time or near real time count of its host table entry usage. In such an implementation, host table update controller 226 may include a component that exists in packet forwarding hardware 206 to maintain the usage counts and a component that executes on the switch management module or on the individual modules to maintain miss counts, compare the miss counts to the usage counts, and replace entries in the host table with entries according to the miss counts if the miss counts exceed the usage counts and a threshold number of miss counts.

In one implementation, a layer 3 packet forwarding device may contain host and LPM tables that are initially unpopulated. Therefore, when a first packet is received, no matching entry will be found in either hardware-implemented host or LPM tables and the packet will be added to a hardware table with a hit bit set to 0. Referring to FIGS. 6A-6B, all layer 3 packets received until the hardware tables will be filled are processed in this way. When subsequent packets are received that have matching entries located in a hardware table, additional steps may be performed. If the received packet is found in a hardware table, its hit bit is set to 1. If the received packet is not located in a hardware table, a determination is made whether to add it to one of the hardware tables. One method includes replacing entries stored in hardware that are older than the age-out period and have a hit bit set to 0, indicating that they have not been accessed since they were first added to the table. Another method includes replacing entries stored in a hardware table if the received packet has a miss count higher than a predetermined threshold, indicating that it has been software processed many times. These possible methods may be used together or separately to use the limited space available in hardware-implemented host tables.

FIGS. 7A-7C are exemplary host and LPM tables for operating modules in LPM mode, host mode, and hybrid mode, respectively. Referring to FIG. 7A, in host table 700, the memory space is populated with full length entries corresponding to hosts and related next hop information for routing layer 3 packets. Full length host entries comprise 32 bits for IPv4 addresses, or 128 bits for IPv6 addresses. The full length host entries and associated next hop information contained in host table 700 indicate the most specific route to the destinations. Therefore, layer 3 packet forwarding devices typically search host table 700 before searching LPM table 702. LPM table 702 is operated in LPM mode and is populated with variable length IP prefixes, prefix lengths, and associated next hop information. When a layer 3 packet arrives at an LPM table operating in LPM mode, logical steps may be performed by a packet forwarding device where the subnet mask for each entry in the LPM table is applied to the destination IP address of the packet, and the masked address searched in the table. In some implementations, these steps may be performed in a single LPM lookup using a special data structure, such as a Radix tree. The entry with the longest prefix that matches the masked address in the received packet is used to extract next hop address information for the packet.

Referring to FIG. 7B, host table 704 is operated in host mode, and is populated with full length entries corresponding to hosts and related next hop information for routing layer 3 packets. Host table 704 contains full length addresses when operated in both host mode and in LPM mode, and as will be discussed below, in hybrid mode. LPM table 706, however, when operated in host mode, is populated in the same manner as host table 704. When operating in host mode, the prefix length for all entries in LPM table 706 are equal to the number of bits of the address. For example, a 32-bit IPv4 host entry in LPM table 706 would have a prefix length of 32, and a 128-bit IPv6 entry would have an associated prefix length of 128. By setting the prefix length for all entries in LPM table 706 to the full length of an address, operating LPM table 706 in host mode effectively converts it into a host table similar to table 704.

Referring to FIG. 7C, as stated above, host table 708 is populated with full length host entries like tables 700 and 704. LPM table 710, on the other hand, when operated in hybrid mode, is populated with both full length host entries and variable length IP prefixes/prefix lengths. The amount of memory space dedicated to either type of entry in LPM table 710 may be user-configured. For example, in one embodiment, the first 100 kilobytes of LPM table 710 may be configured to store full length host entries and fixed full length prefixes. The remaining memory space may be configured to operate in LPM mode and store variable length IP prefixes/prefix lengths similar to table 706. Accordingly, LPM table 710 may be operated in a hybrid mode that combines the features of tables 702 and 706.

Figure 8:
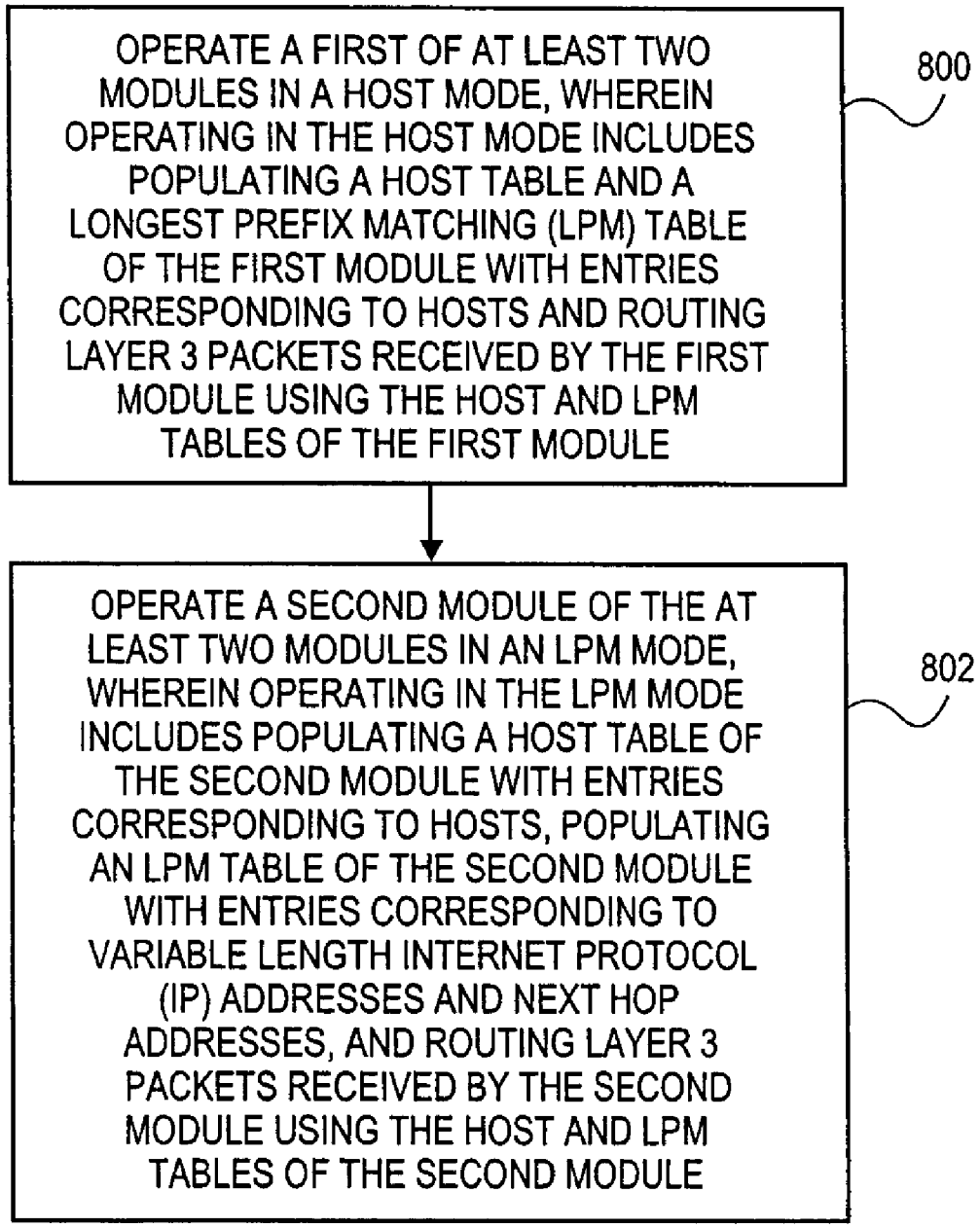
FIG. 8 is a flow chart illustrating an exemplary process for routing packets at a multi-mode layer 3 packet forwarding device according to an embodiment of the subject matter described herein.

FIG. 8 is a flow chart illustrating exemplary steps of a process for routing packets at a multi-mode layer 3 packet forwarding device according to an embodiment of the subject matter described herein. Referring to FIG. 8, a layer 3 packet forwarding device comprises at least two modules, each module comprising a host table and a longest prefix matching (LPM) table implemented in hardware. In step 800, a first module of at least two modules is operated in a host mode that includes populating a host table and an LPM table of the first module with entries corresponding to hosts and routing layer 3 packets received by the first module using the host and LPM tables of the first module.

In step 802, a second module of the at least two modules is operated in LPM mode that includes populating a host table of the second module with entries corresponding to hosts and populating an LPM table with entries corresponding to variable length Internet protocol (IP) addresses and next hop addresses. Layer 3 packets received by the second module are routed using the host and LPM tables of the second module.

Additional Disclosure

Given that hardware table space is limited, it is desirable to manage the table space efficiently and intelligently. In particular, host tables may be implemented as hash tables (e.g., divided into buckets of 8), which provides quick access but severely limits the number of entries stored in the hash tables. Meanwhile, an LPM table is frequently implemented in a ternary content addressable memory (TCAM); TCAMs are expensive, which puts a practical constraint on the size of an LPM table.

As discussed previously, some networks have a large number of directly attached hosts in a relatively flat environment with relatively few IP subnet routes. Other networks have a significant hierarchical structure with relatively few attached hosts while having a large number of subnet routes. Additionally, many network environments are dynamic. For example, in a campus environment, the number of students coming in to a library or computer lab and connecting their laptops varies over time. Various embodiments discussed above allow a user to have some modules to have no provisioned routes and other modules to have a maximum number of provisioned routes. Additional embodiments described herein provide for an adaptable table environment, allowing for a flexible range of provisioned routes based on the current network environment.

Figure 9:
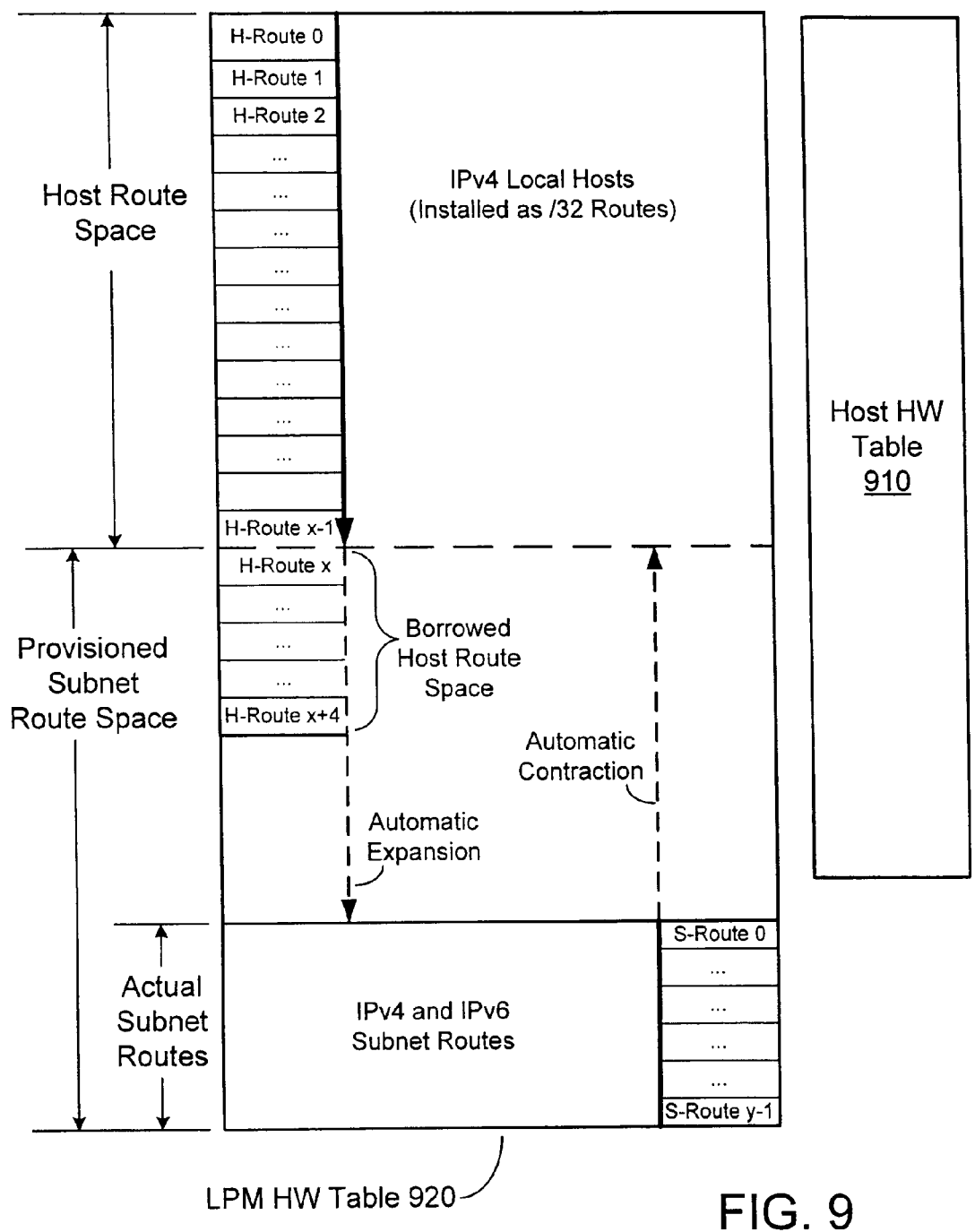
FIG. 9 illustrates and LPM hardware table and a host hardware table according to various embodiments.

FIG. 9 illustrates a host hardware table 910 and an LPM hardware table 920 according to various embodiments. Host table 910 may contain IPv4 multicast hosts and IPv6 hosts; IPv4 unicast hosts can also be stored in host table 910 if space is available. In some embodiments, host table 910 is implemented as a hash table (e.g., having buckets of 8). Thus, in some embodiments, if an IPv6 host or an IPv4 multicast host is seeking entry into host table 910 and the bucket to which it would be assigned is full, then an IPv4 unicast host may be bumped (i.e., deleted) from the table to accommodate the IPv6 or IPv4 multicast host.

LPM table 920 includes provisioned subnet route space and host route space. The provisioned subnet route space may be provisioned by a user. In an example default environment, the host route space might accommodate 16 host routes while the provisioned subnet route space accommodates 480 routes. A user can increase or decrease the provisioned subnet route space as needed. The number of actual subnet routes installed in LPM table 920 may be less than the number of routes provisioned. In various embodiments, any unused provisioned subnet route space can be automatically borrowed (i.e., used if not needed for subnet routes) to store host routes, thereby expanding the host route space in LPM table 920. The borrowed space can be used for host routes as long as that space is not needed for subnet routes. As soon as the borrowed space is needed for subnet routes (which have priority in LPM table 920 over host routes), the host route space automatically contracts and host routes are removed to accommodate the subnet routes. Host routes may be removed based on a least recently used (LRU) algorithm, a volume usage threshold or other mechanism. Host routes that are removed could be moved to host table 910 and/or re-added to LPM table 920 later. Host routes (and subnet routes) that are not installed in either host table 910 or LPM table 920 are handled by software forwarding.

The configuration of a packet forwarding device, such as the packet forwarding device shown in FIG. 2, does not need to be altered or changed to implement embodiments of adaptable tables as discussed herein.

Figure 10A:
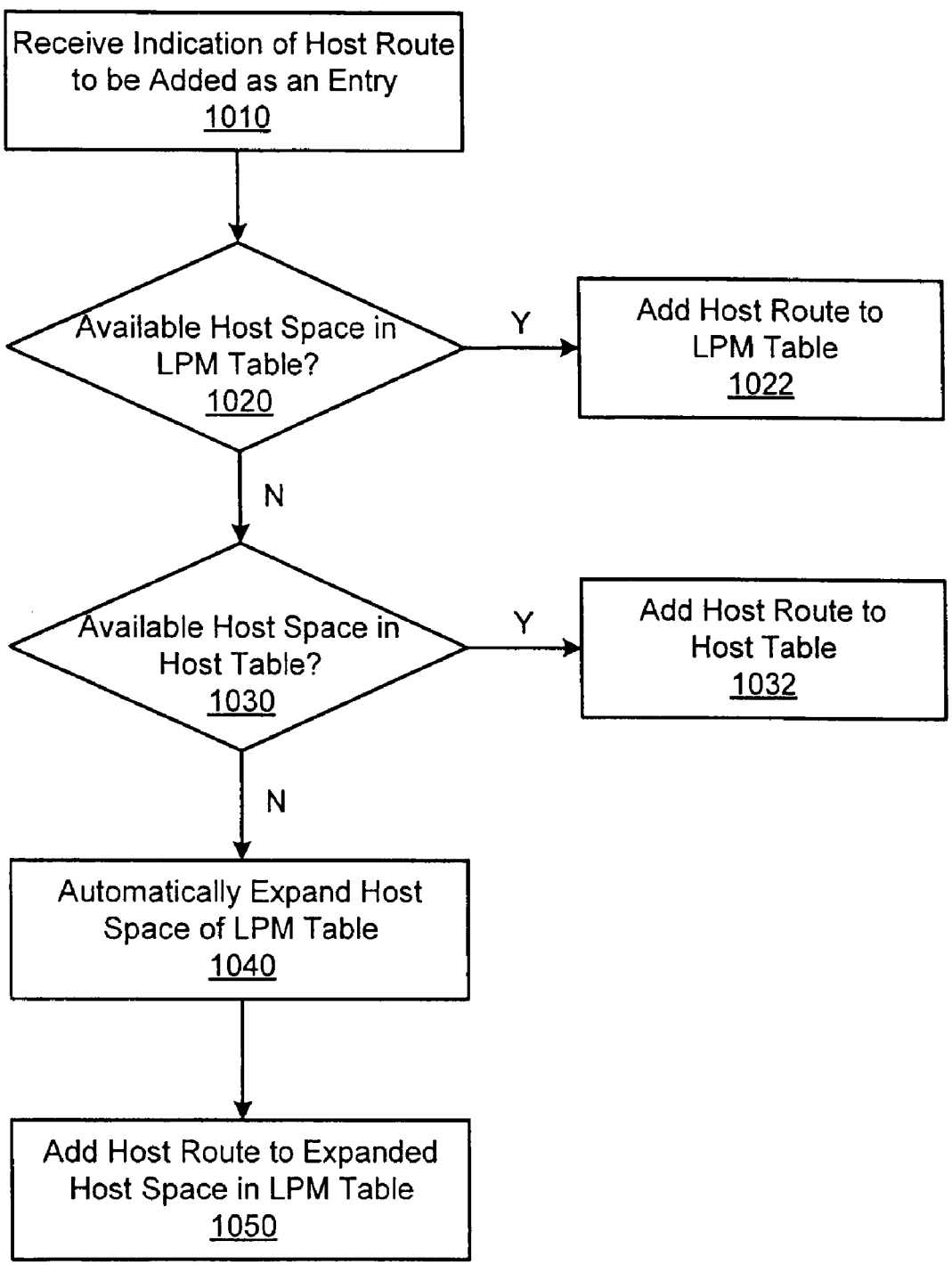
FIGS. 10A-10B are flow diagrams illustrating the addition of routes to a forwarding table according to various embodiments.

FIG. 10A is a flow diagram illustrating a process for adding a host route to a table according to various embodiments. It is not necessary to know or predict the number or type of host or subnet routes that may need to be added in the future; the process handles new hosts or routes one at a time. Thus, an indication of a new host route (e.g., an IPv4 unicast host route) to be added as an entry is received 1010. In embodiments where IPv4 multicast-host routes and IPv6 host routes have priority in the host table (e.g., host table 910), it is preferred (though not necessary) to install the new host route in the host route space of the LPM table (e.g., LPM table 920). Thus, it is determined if space is available in the host route space of the LPM table 1020. The new host route is added in the host route space of the LPM table if space is available 1022.

If space is not available in the LPM table, it is preferred (though not necessary) to install the new host route in the host table (e.g., host table 910). Thus, it is determined if space is available in the host table 1030. If space is available in the host table, then the new host route is installed in the host table 1032. If space is not available in the host table, the host route space of the LPM table is automatically expanded to include unused provisioned subnet space in the LPM table 1040. The host route is then added to the expanded host route space in the LPM table 1050. For example, in an LPM table that has 150 provisioned subnet routes but only 100 subnet routes actually installed, the host route space can be temporarily expanded to borrow 50 route spaces from the provisioned subnet space.

Although FIG. 10A shows a process where the LPM table is checked for available space first and then the Host table is checked for available space, other embodiments may be implemented where the Host table is checked for available space before the LPM table is checked.

Figure 10B:
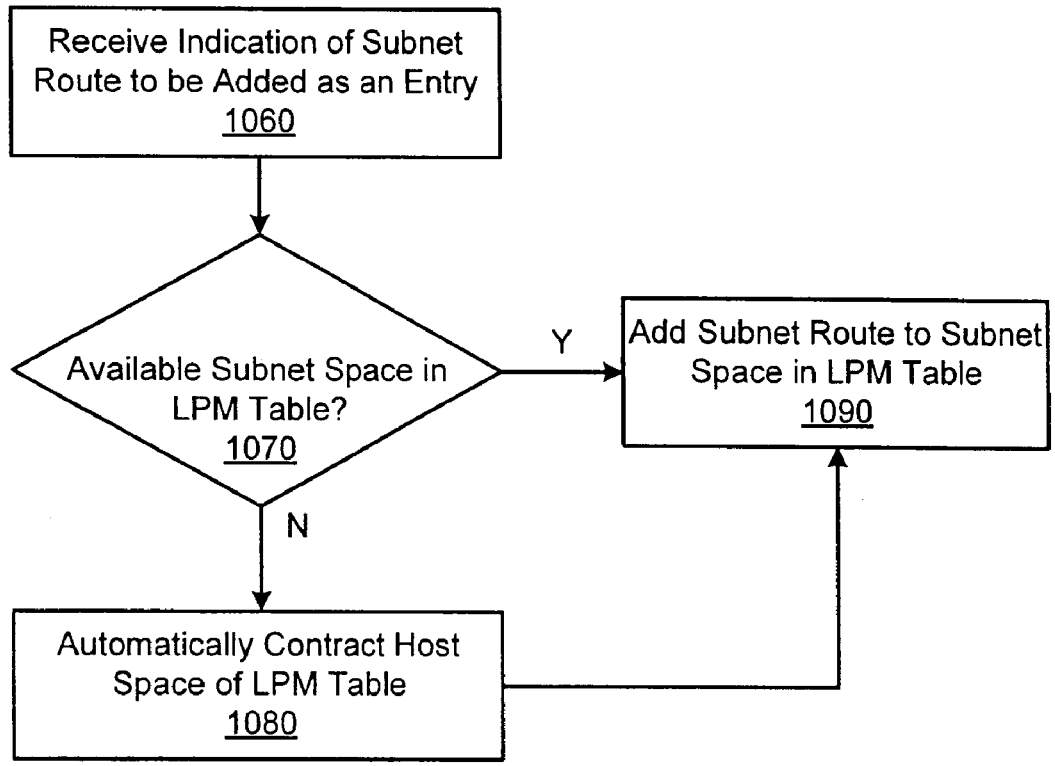

FIG. 10B is a flow diagram illustrating a process for adding a subnet route to an LPM table according to various embodiments. An indication of a subnet route to be added as an entry in the LPM table (e.g., LPM table 920) is received 1060. If it is determined that subnet route space is available in the LPM table 1070, then the subnet route is added to the LPM table 1090. If there is no subnet route space available in the LPM table, the host route space of the LPM table is automatically contracted as needed up to the provisioned boundary 1080. In other words, the host route space is only contracted up to the point that the full provisioned subnet route space is restored. The contraction of the host route space is an expansion of the subnet route space. The subnet route space cannot be expanded beyond the provisioned boundary. For example, if 150 subnet routes were originally provisioned but only 100 subnet routes were being used, then the host route space could "borrow" the unused space (i.e., 50 routes). Subnet route space could be recaptured later as needed, but only up to the 50 borrowed routes. In other words, subnet route space cannot exceed the originally provisioned 150 routes, unless the LPM table is re-provisioned (e.g., by a user).

What is claimed is:

1. A method, comprising:
receiving a host route to be added as an entry to a forwarding database, wherein the forwarding database comprises a hardware implemented table having a first storage area provisioned to store host routes and a second storage area provisioned to store subnet routes;
checking the first storage area to determine if space is available for the host route to be added;
adding the host route to the first storage area of the hardware implemented table when space is determined to be available for the host route; and
when space is determined to not be available in the first storage area of the hardware implemented table:
expanding the first storage area of the hardware implemented table to include space from the second storage area that is provisioned to store the subnet routes but is unused space for storing the subnet routes when expanding the first storage area, and
adding the host route to an expanded space in the expanded first storage area of the first hardware implemented table.

2. The method of claim 1, further comprising:
receiving a subnet route to be added as an entry to the second storage area of the hardware implemented table;
checking the second storage area to determine if space is available for the subnet route to be added;
adding the subnet route to the second storage area of the hardware implemented table when space is determined to be available in the second storage area; and
when space is determined to not be available in the second storage area:
contracting the expanded first storage area of the hardware implemented table to expand the second storage area, and
adding the subnet route to the expanded second storage area.

3. The method of claim 2, wherein expansion of the second storage area is limited to a predefined threshold corresponding to an amount of space originally provisioned to the second storage area to store subnet routes prior to the second storage area being contracted to expand the first storage area.

4. The method of claim 1, wherein the first storage area comprises a longest prefix match (LPM) hardware table and wherein the second storage area comprises a host hardware table.

5. The method of claim 1, wherein the space allocated to the second storage area is user-provisioned.

6. The method of claim 1, wherein the host route is one of an Internet Protocol version 4 (IPv4) or an IPv6 unicast host route.

7. The method of claim 2, wherein the subnet route is one of an IPv4 subnet route or an IPv6 subnet route.

8. The method of claim 4, further comprising bumping an IPv4 unicast host route from the host hardware table to accommodate an IPv6 host or an IPv4 multicast host seeking entry into the host hardware table.

9. A packet forwarding device, comprising:
a hardware module having a hardware implemented forwarding database table including a first storage area provisioned to store host routes and a second storage area provisioned to store subnet routes, the first storage area to expand to include space from the second storage area that is provisioned to store the subnet routes but is unused space for storing the subnet routes when expanding the first storage area, the expanded space of the first storage area to accommodate a host route when no space is available in the first storage area of the hardware module.

10. The packet forwarding device of claim 9, wherein the expanded first storage area to contract and the second storage area to expand to accommodate a subnet route when no space is available in the second storage area.

11. The packet forwarding device of claim 9, wherein the second storage area is user provisioned.

12. The packet forwarding device of claim 9, wherein the host route is one of an Internet Protocol version 4 (IPv4) or an IPv6 unicast host route.

13. The packet forwarding device of claim 10, wherein the subnet route is one of an IPv4 subnet route or an IPv6 subnet route.

14. A method, comprising:
receiving a subnet route to be added as an entry to a forwarding database, wherein the forwarding database comprises a hardware implemented table having a first storage area provisioned to store host routes and a second storage area provisioned to store subnet routes;
checking the second storage area to determine if space is available for the subnet route to be added;
adding the subnet route to the second storage area of the hardware implemented table when space is determined to be available for the subnet route; and
when space is determined to not be available in the second storage area of the hardware implemented table:
expanding the second storage area of the hardware implemented table to include space from the first storage area that is provisioned to store the host routes and is space originally provisioned to the second storage area to store subnet routes prior to the second storage area being contracted to expand the first storage area, and
adding the subnet route to an expanded space in the expanded second storage area of the hardware implemented table.

15. The method of claim 14, further comprising:
receiving a host route to be added as an entry to the first storage area of the hardware implemented table;
checking the first storage area to determine if space is available for the host route to be added;
adding the host route to the first storage area of the hardware implemented table when space is determined to be available in the first storage area; and
when space is determined to not be available in the first storage area:
contracting the expanded second storage area of the hardware implemented table with space from the second storage area that is provisioned to store the subnet routes but is unused space for storing the subnet routes when expanding the first storage area, and
adding the host route to the expanded first storage area.

16. A non-transitory computer readable storage medium having instructions stored thereon that, when executed by an electronic device, cause the electronic device to perform a method comprising:
receiving a host route to be added as an entry to a forwarding database, wherein the forwarding database comprises a hardware implemented table having a first storage area provisioned to store host routes and a second storage area provisioned to store subnet routes;
checking the first storage area to determine if space is available for the host route to be added;
adding the host route to the first storage area of the hardware implemented table when space is determined to be available for the host route; and
when space is determined to not be available in the first storage area of the hardware implemented table:
expanding the first storage area of the hardware implemented table to include space from the second storage area that is provisioned to store the subnet routes but is unused space for storing the subnet routes when expanding the first storage area, and
adding the host route to an expanded space in the expanded first storage area of the hardware implemented table.

17. The non-transitory computer-readable storage medium of claim 16, wherein the method further comprises:
receiving a subnet route to be added as an entry to the second storage area of the hardware implemented table;
checking the second storage area to determine if space is available for the subnet route to be added;
adding the subnet route to the second storage area of the hardware implemented table when space is determined to be available in the second storage area; and
when space is determined to not be available in the second storage area:
contracting the expanded first storage area of the hardware implemented table to expand the second storage area, and
adding the subnet route to the expanded second storage area.

18. The non-transitory computer-readable storage medium of claim 16, wherein the second storage area is a longest prefix match (LPM) table and wherein the first storage area is a host hardware table.

19. The non-transitory computer-readable storage medium of claim 16, wherein the host route is one of an Internet Protocol version 4 (IPv4) or an IPv6 unicast host route.

20. The non-transitory computer-readable storage medium of claim 17, wherein the subnet route is one of an IPv4 subnet route or an IPv6 subnet route.

21. The non-transitory computer-readable storage medium of claim 18, wherein the method further comprises:
bumping an IPv4 unicast host from the host hardware table to accommodate an IPv6 host or an IPv4 multicast host seeking entry into the host hardware table.

\* \* \* \* \*